US008185240B2

(12) United States Patent
Williams et al.

(10) Patent No.: US 8,185,240 B2
(45) Date of Patent: May 22, 2012

(54) AUTOMATED APPARATUS FOR CONSTRUCTING ASSEMBLIES OF BUILDING COMPONENTS

(75) Inventors: Jeffrey P. Williams, Hillsborough, NC (US); Siroberto Scerbo, Durham, NC (US)

(73) Assignee: Williams Robotics, LLC, Burlington, NC (US)

( * ) Notice: Subject to any disclaimer, the term of this patent is extended or adjusted under 35 U.S.C. 154(b) by 386 days.

(21) Appl. No.: 12/547,806

(22) Filed: Aug. 26, 2009

(65) Prior Publication Data
US 2010/0057242 A1 Mar. 4, 2010

Related U.S. Application Data

(60) Provisional application No. 61/092,933, filed on Aug. 29, 2008, provisional application No. 61/101,749, filed on Oct. 1, 2008.

(51) Int. Cl.
*G06F 19/00* (2006.01)
*G06F 7/00* (2006.01)

(52) U.S. Cl. ........ 700/245; 700/159; 700/160; 700/179; 700/213; 901/2; 901/8; 901/15; 901/27; 901/31; 901/41

(58) Field of Classification Search .......... 700/159–160, 700/179, 213, 245; 901/2, 8, 15, 27, 31, 901/41
See application file for complete search history.

(56) References Cited

U.S. PATENT DOCUMENTS

| | | | | |
|---|---|---|---|---|
| 4,590,578 A * | 5/1986 | Barto et al. | ..... | 700/254 |
| 4,655,676 A * | 4/1987 | Jannborg et al. | ..... | 414/736 |
| 4,741,078 A * | 5/1988 | Kimura | ..... | 29/39 |
| 4,763,726 A * | 8/1988 | Failing | ..... | 165/146 |
| 4,809,425 A * | 3/1989 | Monforte | ..... | 483/1 |
| 4,815,011 A * | 3/1989 | Mizuno et al. | ..... | 700/264 |
| 4,867,819 A | 9/1989 | Richardelli et al. | | |
| 4,883,939 A * | 11/1989 | Sagi | ..... | 219/125.1 |
| 5,127,139 A * | 7/1992 | McCowin et al. | ..... | 29/26 A |
| 5,284,000 A * | 2/1994 | Milne et al. | ..... | 52/749.14 |
| 5,649,888 A * | 7/1997 | Micale et al. | ..... | 483/11 |
| 5,791,032 A * | 8/1998 | Spencer et al. | ..... | 29/48.5 A |
| 5,798,627 A * | 8/1998 | Gilliland et al. | ..... | 318/568.14 |
| 5,974,643 A * | 11/1999 | Hays et al. | ..... | 29/39 |
| 6,163,946 A * | 12/2000 | Pryor | ..... | 29/407.04 |
| 2009/0038258 A1* | 2/2009 | Pivac et al. | ..... | 52/749.14 |
| 2010/0170202 A1* | 7/2010 | Bray et al. | ..... | 53/444 |

FOREIGN PATENT DOCUMENTS

| | | |
|---|---|---|
| GB | 2 393 205 A | 3/2004 |
| JP | 06238608 | 8/1994 |
| JP | 09248805 | 9/1997 |

OTHER PUBLICATIONS

Robot Assembly System for the Construction Process Automation, by E. Gambao et al., printed from IEEE website on Nov. 11, 2009, 6 pages.*
Site Assembly in Construction Industry by Means of a Large Range Advanced Robot, by C. Balagur et al., printed from IEEE website on Nov. 11, 2011, 8 pages.*
A Robotic System for Automated Masonry, by E. Gambao et al., printed from IEEE on Nov. 11, 2011, 4 pages.*
International Search Report and Written Opinion for PCT/US2009/055101, dated Dec. 28, 2009.

* cited by examiner

*Primary Examiner* — Ronald Hartman, Jr.
(74) *Attorney, Agent, or Firm* — Myers Bigel Sibley & Sajovec

(57) ABSTRACT

A device for constructing an assembly of building components includes an articulating arm unit and a gripper/nailer mounted on an end of the articulating arm unit. The gripper/nailer includes a gripping unit for grasping building components and positioning them in a predetermined arrangement and a nailing unit for inserting a fastener to secure the building components together.

29 Claims, 23 Drawing Sheets

AUTOMATED APPARATUS FOR CONSTRUCTING ASSEMBLIES OF BUILDING COMPONENTS

RELATED APPLICATIONS

This application claims priority from U.S. Provisional Patent Application No. 61/092,933, filed Aug. 29, 2008, and from U.S. Provisional Patent Application No. 61/101,749, filed Oct. 1, 2008, the disclosures of which are hereby incorporated herein in their entireties.

FIELD OF THE INVENTION

This invention relates generally to construction of buildings, and more particularly relates to devices for the construction of wall panels.

BACKGROUND OF THE INVENTION

Wall panels for the wall of a dwelling typically comprise a series of lumber boards arranged in a predetermined pattern and nailed together. Wall panel design varies from house to house because of consumer demand for individualized home design, although in some instances multiple wall panels for the same house will have the same arrangement. Most wall panels will include top and bottom horizontal boards and a number (often determined by a building code) of vertical boards to provide support. Often two or more vertical boards will be arranged in abutted fashion with the long axis of at least of one rotated 90° to form strengthened posts for corners and wall intersections. The horizontal and vertical boards are nailed together to form a panel. The panel is then installed in the dwelling at a desired time. Depending on the nature of the project, the panels may be fabricated on-site or remotely for subsequent transport and use.

Some wall panels include so-called "rough openings", which are openings within the frame of the panel for windows, doors and the like (see, e.g., FIGS. 2 and 3, which show a wall panel 15 that includes an opening 16 for a door, and a wall panel 20 that includes a rough opening 21 for a window). The numbers and sizes of boards around rough openings are often regulated by building codes. Also, the locations and sizes of rough openings can vary significantly based on the personal preferences of the homeowner or builder. As a result, automation of the wall panel fabrication process has been limited.

It may be desirable to provide an automated process by which wall panels, and in particular wall panels with rough openings, can be constructed in a more extemporaneous fashion with reduced setup and change-over time from panel-to-panel.

SUMMARY OF THE INVENTION

As a first aspect, embodiments of the invention are directed to a device for constructing an assembly of building components. The device comprises an articulating arm unit; and a gripper/nailer mounted on an end of the articulating arm unit. The gripper/nailer includes a gripping unit for grasping building components and positioning them in a predetermined arrangement, and a nailing unit for inserting a fastener to secure the building components together. With a device of this configuration, the construction of assemblies, such as wall and door panels, can be significantly facilitated.

As a second aspect, embodiments of the invention are directed to a system for constructing an assembly of building components, comprising: a frame; an articulating arm unit mounted on the frame; a gripper/nailer mounted on an end of the articulating arm unit, wherein the gripper/nailer includes a gripping unit for grasping building components and positioning them in a predetermined arrangement, and a nailing unit for inserting a fastener to secure the building components together; and a support surface mounted on the frame, the support surface positioned and configured to receive building components from the gripping unit and maintain the building components in position for securing by the nailing unit. This combination of components can provide a system that automatically assembles and secures building components, such as boards for a wall panel with or without window or door openings.

As a third aspect, embodiments of the invention are directed to a device for constructing an assembly of building components, comprising: an articulating arm unit; a gripper mounted on an end of the articulating arm unit that includes a gripping unit for grasping building components and positioning them in a predetermined arrangement; and a controller that is operably associated with the articulating arm and the gripper. The controller is configured to receive data from a computer-aided drafting (CAD) file, convert that data into component positions, and provide instructions to the gripper on component placement.

As a fourth aspect, embodiments of the invention are directed to a computer program product for controlling operation of a system for constructing assemblies of building components, comprising a computer readable storage medium having computer readable program code embodied therein. The computer readable program code comprises: computer readable program code configured to receive data regarding an assembly of building components; computer readable program code configured to direct a gripper on an articulating arm unit to retrieve individual building components from a supply of building components; computer readable program code configured to direct the gripper on the articulating arm unit to position the building components in predetermined positions to form a predetermined arrangement of building components; and computer readable program code configured to direct a nailing unit mounted on the articulating arm unit to secure the building components together to form an assembly of building components.

As a fifth aspect, embodiments of the invention are directed to a device for constructing an assembly of building components, comprising: an articulating arm unit; and a mounting location on the articulating arm unit for either of (a) a gripping unit for grasping building components and positioning them in a predetermined arrangement, and (b) a nailing unit for inserting a fastener to secure the building components together.

As a sixth aspect, embodiments of the invention are directed to a device for constructing an assembly of building components, comprising: an articulating arm unit; a gripping unit mounted on an end of the articulating arm unit for grasping building components and positioning them in a predetermined arrangement; and an automated nailing unit for inserting a fastener to secure the building components together.

As a seventh aspect, embodiments of the invention are directed to a device for constructing an assembly of building components, comprising a Cartesian robotic unit; and a gripper/nailer mounted on an end of the articulating arm unit. The gripper/nailer includes a gripping unit for grasping building components and positioning them in a predetermined arrangement and a nailing unit for inserting a fastener to secure the building components together.

As an eighth aspect, embodiments of the invention are directed to a device for constructing an assembly of building components, comprising an articulating arm unit and a gripper/nailer mounted on an end of the articulating arm unit. The gripper/nailer includes a gripping unit for grasping building components and positioning them in a predetermined arrangement, and a nailing unit for inserting a fastener to secure the building components together. The gripper/nailer further includes a drill or router for forming holes in the building components.

DETAILED DESCRIPTION OF EMBODIMENTS OF THE INVENTION

Figure 1:
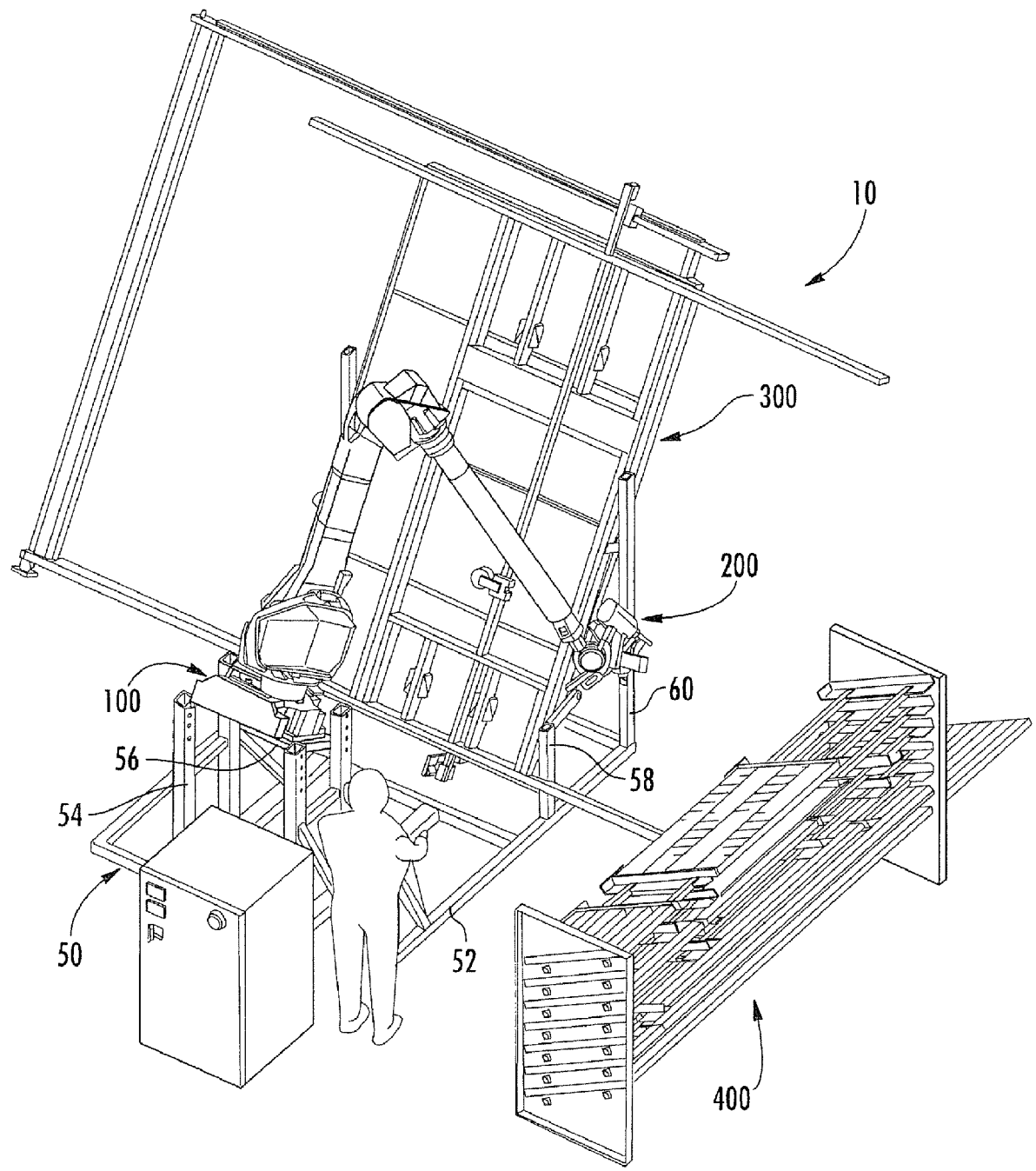
FIG. 1 is a perspective view of a system for constructing an assembly of building components according to embodiments of the present invention.
Figure 2:
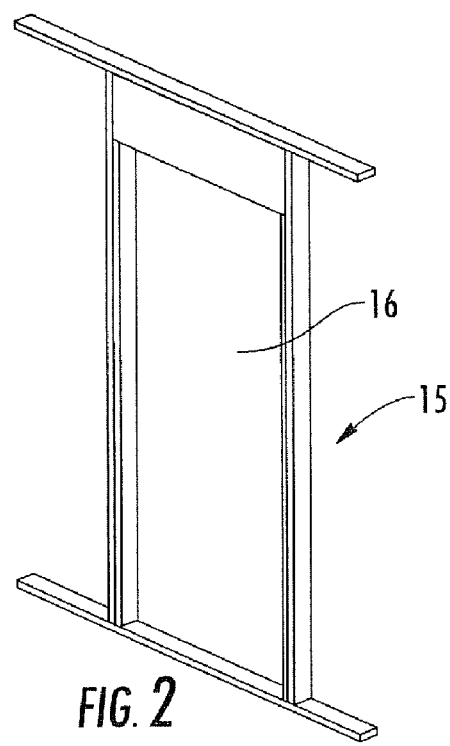
FIG. 2 is a perspective view of a wall panel with a rough opening for a door.
Figure 3:
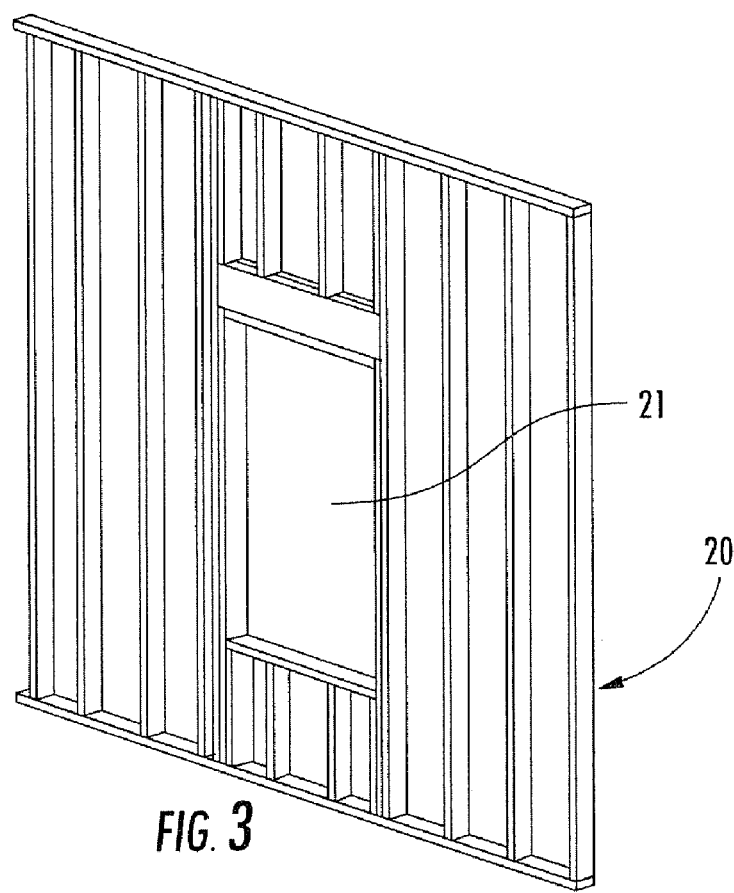
FIG. 3 is a perspective view of a wall panel with a rough opening for a window.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Turning now to the drawings, an automated wall panel fabrication system, designated broadly at 10, is shown in FIG. 1. Generally, the system 10 includes an articulating arm unit 100 having a gripper/nailer 200 at one end thereof and a work table 300, each of which is mounted on a frame 50. A rack 400 that supplies boards to the system 10 is located adjacent the frame 50. These components are described separately below.

In describing the components, the "forward" direction will be the direction extending from the articulating arm unit 100 toward the work table 300, and the "rearward" direction will the direction opposite the forward direction.

Frame

Referring again to FIG. 1, the frame 50 includes a base 52 having a skeletal structure that is configured to rest on an underlying surface. A skeletal pedestal 54 rises from the forward central portion of the base 52. A mounting surface 56 is mounted to the upper end portions of the members that form the pedestal 54. In some embodiments, the mounting surface 56 is tilted so that it faces the rear of the frame; the tilt angle is typically between about 10 and 30 degrees relative to vertical, but in some embodiments may be up to 90 degrees (and in other embodiments the mounting surface may be above the work table 300 and face downwardly). The mounting surface 56 provides a mounting location for the articulating arm unit 100.

A pair of forward uprights 58 are mounted to and extend upwardly from the base 52 rearwardly of the pedestal 56. A pair of rear uprights 60 are mounted to the rear end of the base 52 and extend upwardly therefrom to an elevation higher than that of the forward uprights 58. The front and rear uprights 58, 60 provide mounting locations for the work table 300.

Those skilled in this art will appreciate that the frame 50 may take many other configurations and be suitable for use with the present invention. As one example, the frame may be mounted on a vehicle, such as a truck (see details in FIG. 16 and the accompanying discussion), that can transport the system to a construction site so that fabrication of wall panels can be carried out on-site.

Articulating Arm Unit

Figure 4:
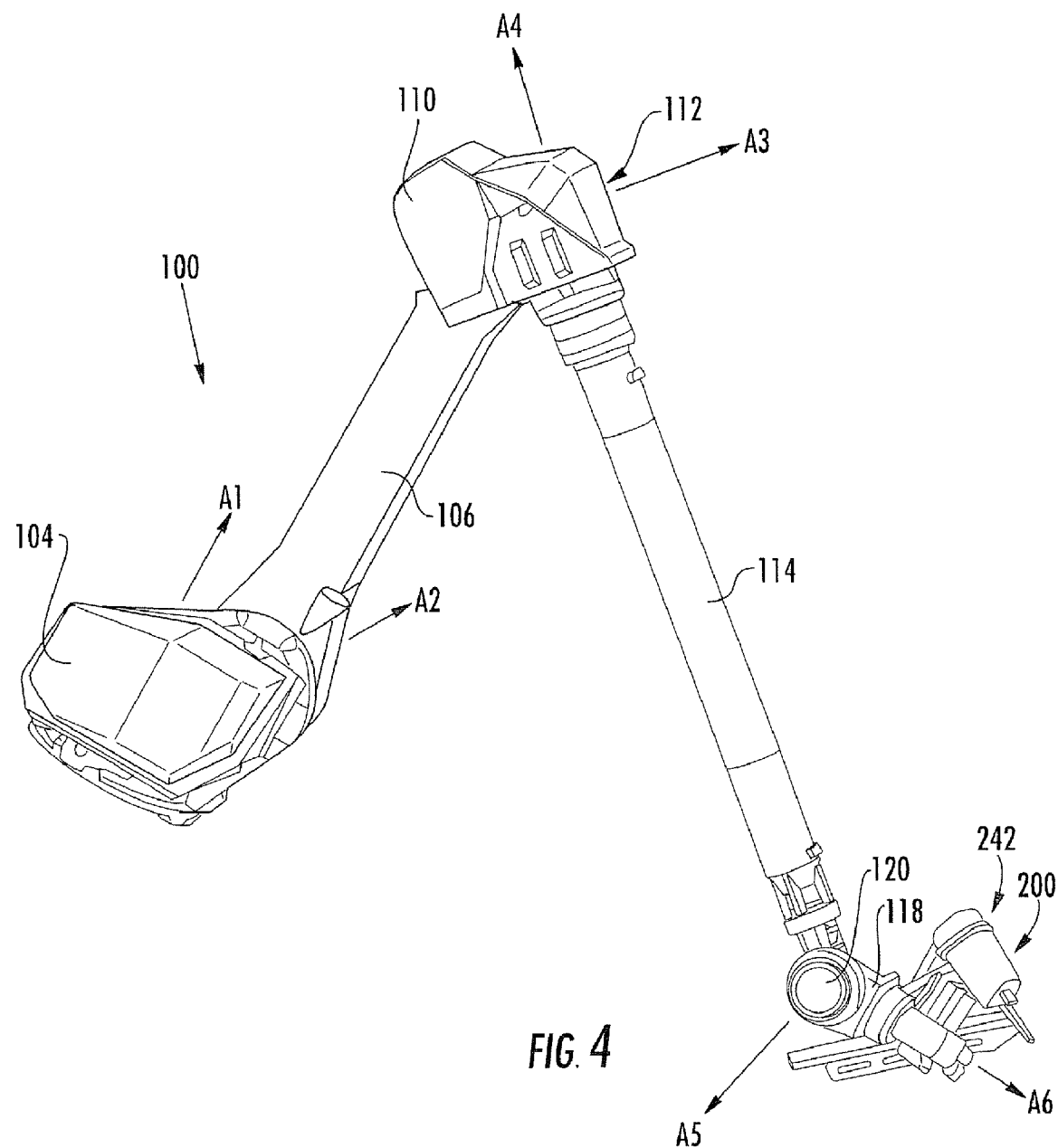
FIG. 4 is a right perspective view of the articulating arm unit with a gripper/nailer of FIG. 1.
Figure 5:
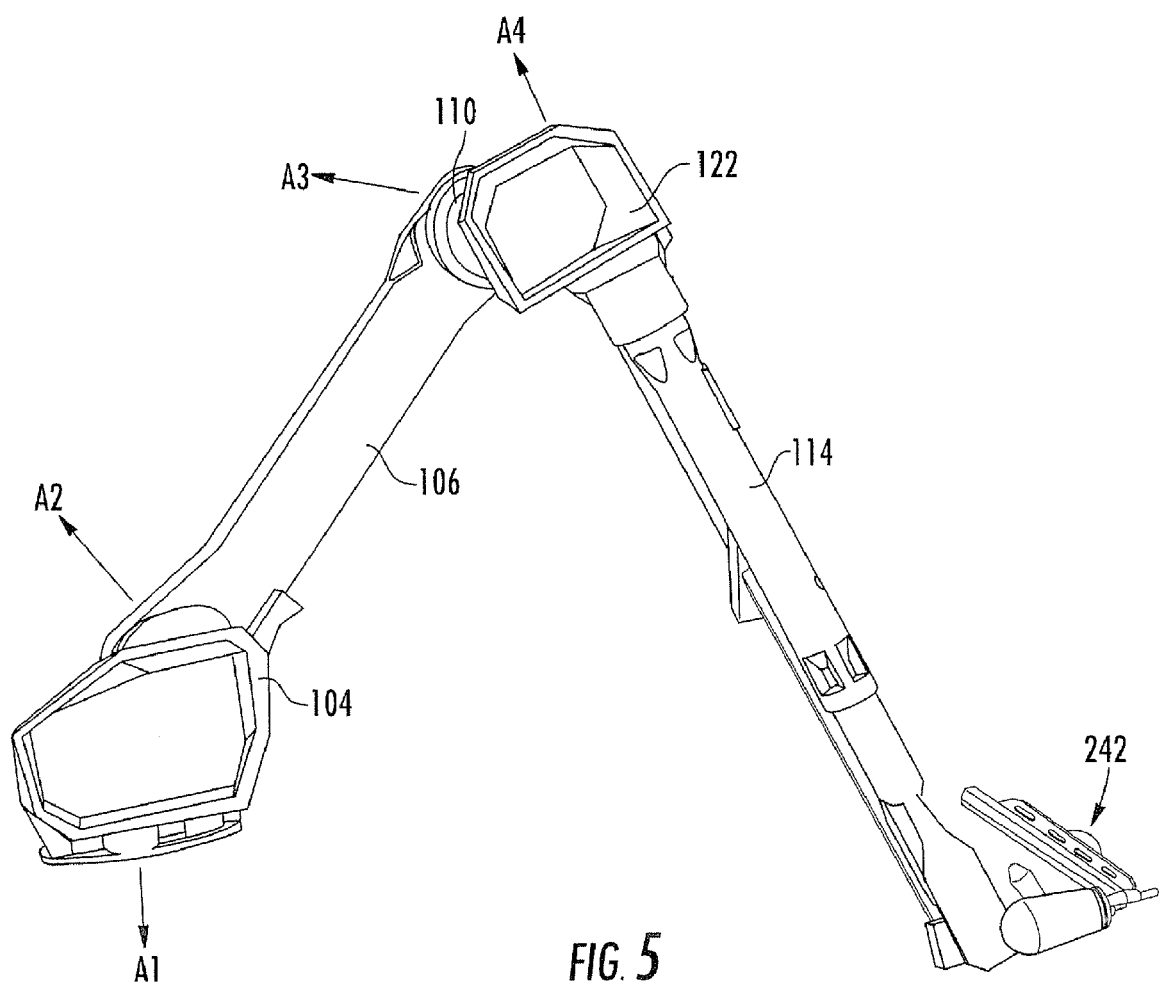
FIG. 5 is a left perspective view of the articulating arm unit and gripper/nailer of the system of FIG. 1.
Figure 6:
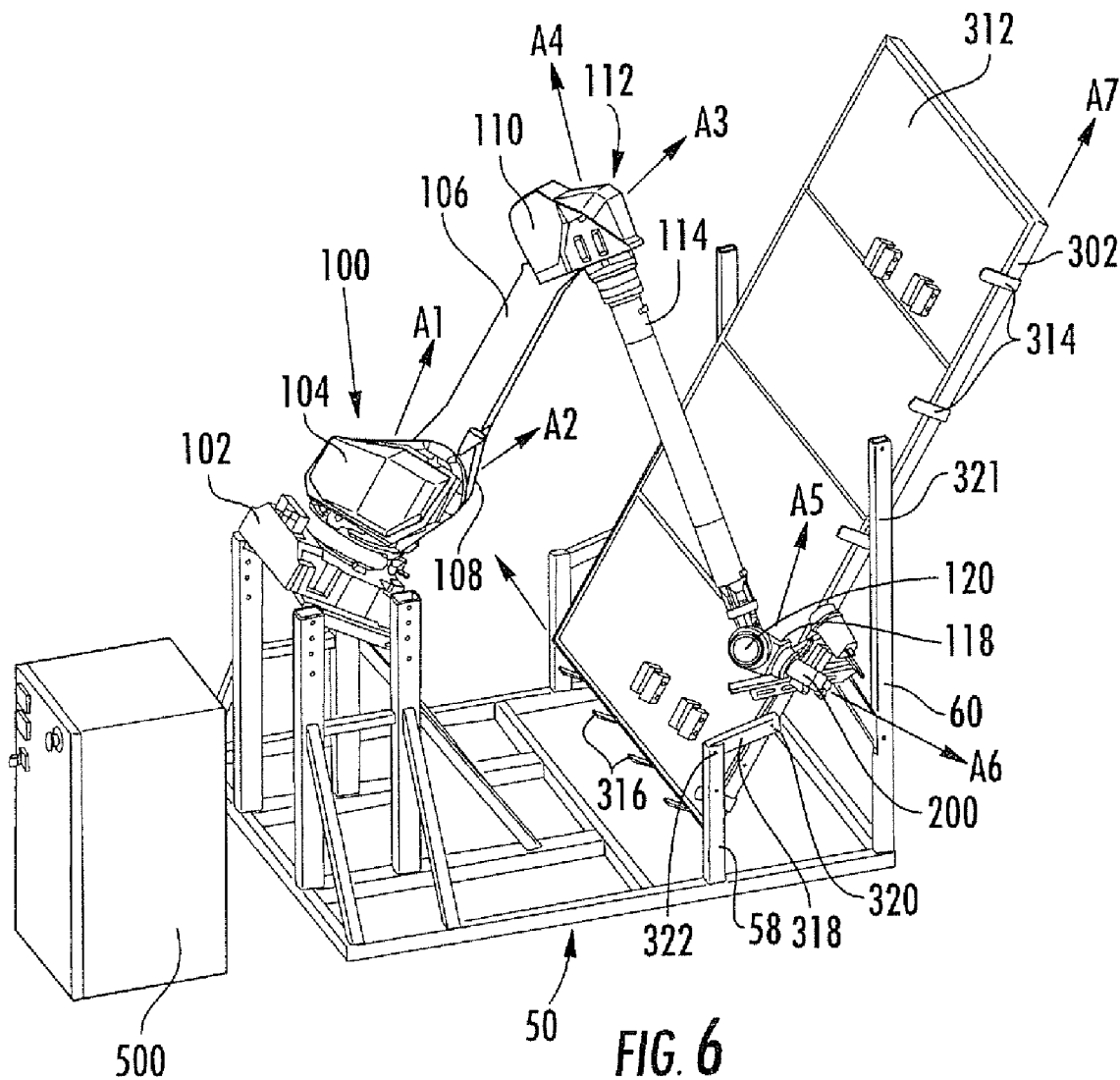
FIG. 6 is a right perspective view of the articulating arm unit and the work table of the system of FIG. 1.

Turning now to FIGS. 4-6, the articulating arm unit 100 is a largely conventional 6-axis robotic arm. The arm unit 100 includes a stationary base 102 that is mounted to the mounting surface 56 of the frame 50. A rotating base 104 is rotatably mounted onto the stationary base 102 for rotation about an axis A1 that is generally normal to the mounting surface 56. A proximal arm member 106 is pivotally attached to the rotating base 104 at a pivot 108 that defines an axis A2 that is generally parallel to the mounting surface 56 and normal to the axis A1. The proximal arm member 106 extends away from the rotating base 104. An elbow member 110 is pivotally attached to the extended end of the proximal arm member at a pivot 112, which defines an axis A3 that is generally normal to the axis A1 and to the proximal arm member 106. A distal arm member 114 is rotatably attached to the elbow member 110 for rotation about an axis A4 that is substantially parallel to the distal arm member 114 and normal to the axis A3. At its far end, the distal arm member 114 is attached to a wrist member 118 at a pivot 120 that defines an axis A5 that is normal to the distal arm member 114 and to the axis A4. The wrist member 118 serves as the mounting member for the gripper/nailer 200, which is rotatably mounted thereto for rotation about an axis A6 that is normal to the axis A5.

The movement of the different members of the articulating arm unit 100 are controlled by a controller 500 (described in detail below). In some embodiments, the controller 500 is part of an internal system that is supplied with the arm unit 100 itself; in other embodiments, the controller 500 is a personal computer or other external processing device that is connected to the articulating arm unit 100.

In some embodiments, the range of pivoting/rotation about the various axes of the device can vary. In one embodiment, the axes as identified above have the angular ranges set forth in Table 1 below.

TABLE 1

| Axis | Angular Range (Degrees) |
|---|---|
| A1 | 360 |
| A2 | 225 |
| A3 | 432 |
| A4 | 400 |
| A5 | 280 |
| A6 | 900 |

An exemplary articulating arm unit is Model No. M-710iC/20L, available from Fanuc Robotics America, Inc., Rochester Hills, Mich. Such a unit may be modified, particularly at the wrist member, to accommodate the gripper/nailer 200. Other 6-axis articulating arm units may also be employed. Furthermore, the present invention is not limited to robots with fewer or more axes of motion, or to a single robot; multiple robotic arms for the movement of different tools may be employed.

Gripper/Nailer

Figure 7:
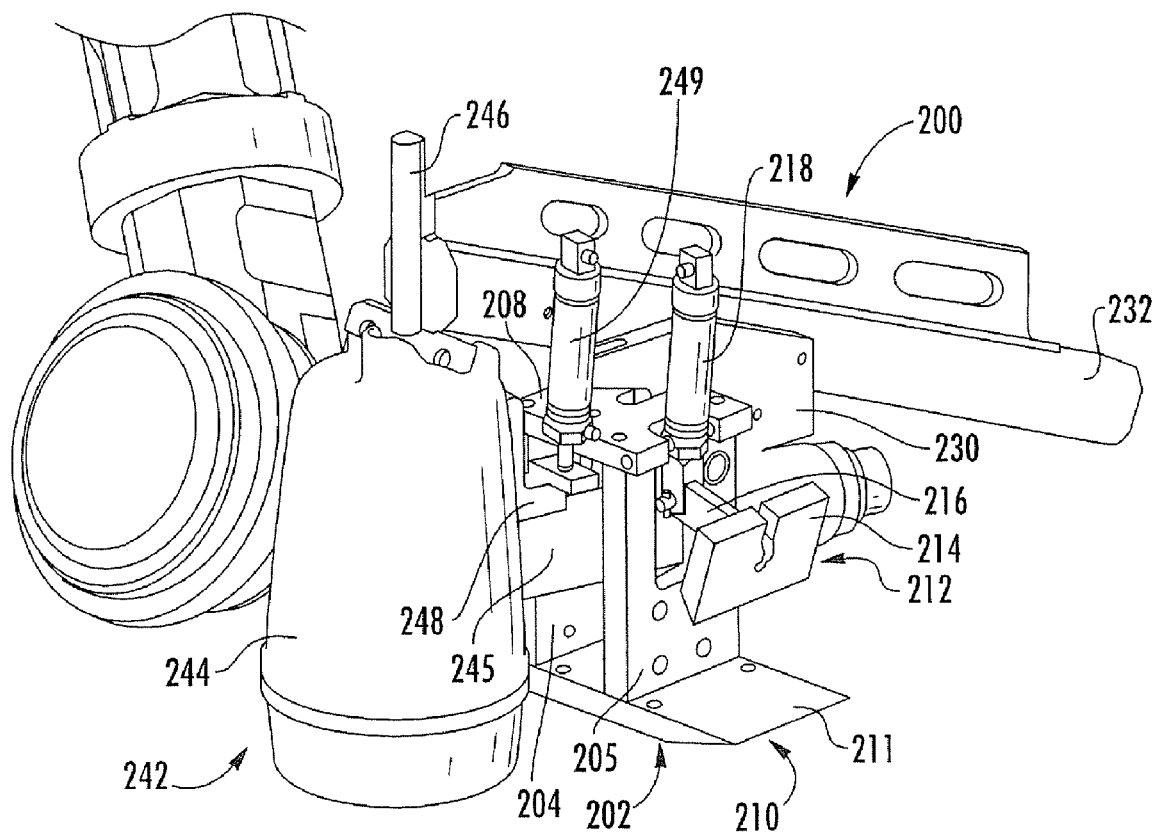
FIG. 7 is an enlarged perspective view of the gripper/nailer of the system of FIG. 1 with the stabilizing foot removed.
Figure 8:
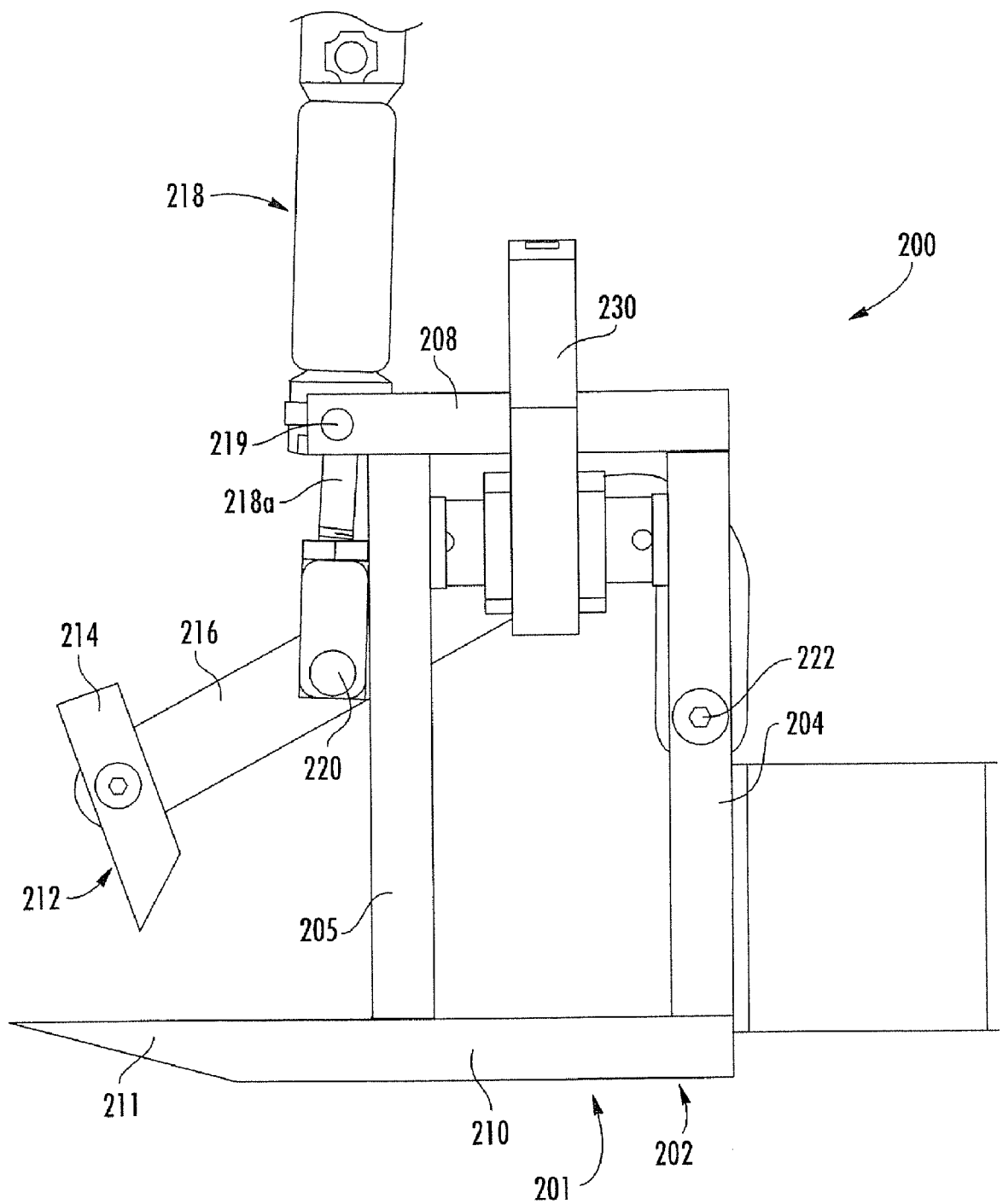
FIG. 8 is a side view of the gripper/nailer of FIG. 7 with the nailing unit components removed.
Figure 9:
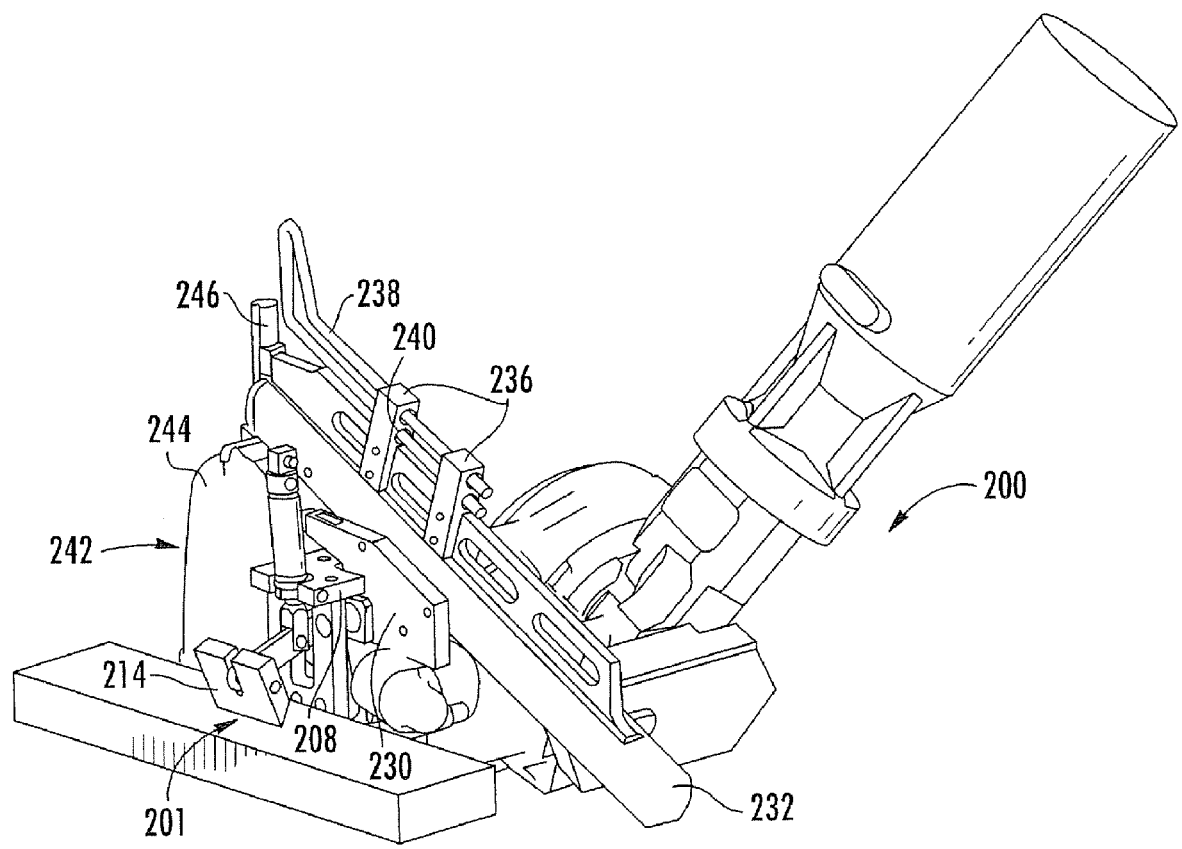
FIG. 9 is an enlarged reverse perspective view of the gripper/nailer of the system of FIG. 1.

Turning now to FIGS. 7-9, the gripper/nailer 200 is mounted onto the wrist member 118. The gripper/nailer 200 has a gripper unit 201 that includes a frame 202 that includes two supports 204, 205 that are generally parallel to each other. A support member 208 spans and is fixed to upper ends of the supports 204, 205. A stationary grip finger panel 210 is fixed to the ends of the supports 204, 205 opposite the support member 208. A finger 211 extends from one end of the panel 210.

A movable grip finger unit 212 is mounted to the support member 208. The movable grip finger unit 212 includes a finger 214 that is mounted on one end to a pivot arm 216. The pivot arm 216 is generally J-shaped and is attached at one end to the support 204 at a pivot 222. A pneumatic cylinder unit 218 is pivotally attached to the support member 208 at a pivot 219 with its retractable rod 218a extending downwardly to a pivot 220 with the pivot arm 216.

Those skilled in this art will appreciate that the gripper unit may take other configurations. For example, rather than pneumatic actuation, the gripping movement may be controlled mechanically, hydraulically, or electromagnetically. The shapes of the gripping fingers may vary, as may the shapes of the links causing the fingers to grip. In some embodiments, both gripper fingers may move in the grasping motion. Other configurations will be apparent to those of skill in the art and need not be detailed herein.

Referring now to FIGS. 7 and 9, a nailer mounting panel 230 is fixed to the cross-member 208 and extends upwardly and downwardly therefrom. A nailing unit 242 is mounted to the panel 230. The nailing unit 242 includes a plenum 244 that has a handle 245 which is mounted to the panel 230 under the cross-member 208. A trigger 248 is incorporated into the handle 245. The trigger 248 can be actuated by an electric solenoid, a pneumatic cylinder, or the like that engages the trigger 248.

A barrel 246 extends from one end of the plenum 244 above the cross-member 208. A magazine 232 is attached to the barrel 246 and is configured to supply nails sequentially to the barrel 246. The magazine 232 is also mounted to the nailer mounting panel 230. Thus, the nailing unit 242 is mounted such that the barrel 246 extends in a direction that is generally away from the stationary grip finger 211. This orientation can provide both the gripping unit 201 and the nailing unit 242 with sufficient space to operate without interference from the other unit.

A board-aligning stabilizing foot 238 is mounted to the magazine 232 via a pair of brackets 236 (FIG. 9). A spring 240 is attached to the foot 238 and positioned between the brackets 236 to bias the foot 238 toward the barrel 246. Other stabilizing features, such as gripping and positioning features, may also be employed, or stabilizing features may be omitted entirely.

An exemplary nailing unit is the DEWALT D51844 nailing gun, available from Black & Decker Corporation, Towson, Md. Other nailing units may also be employed. For example, the trigger may be actuated by other mechanisms, such as a mechanical piston or the like. Alternatively, the nailing unit may lack an external trigger, which can be replaced by a directing acting valve signaled by the controller 500. The nailing unit 242 may also be oriented differently relative to the gripper unit 201. The nailing unit 242 may even insert a different fastener, such as a staple; it is intended that the terms "nailing unit" and "nailer" encompass devices that insert other fasteners that penetrate boards in addition to nails.

Figure 20:
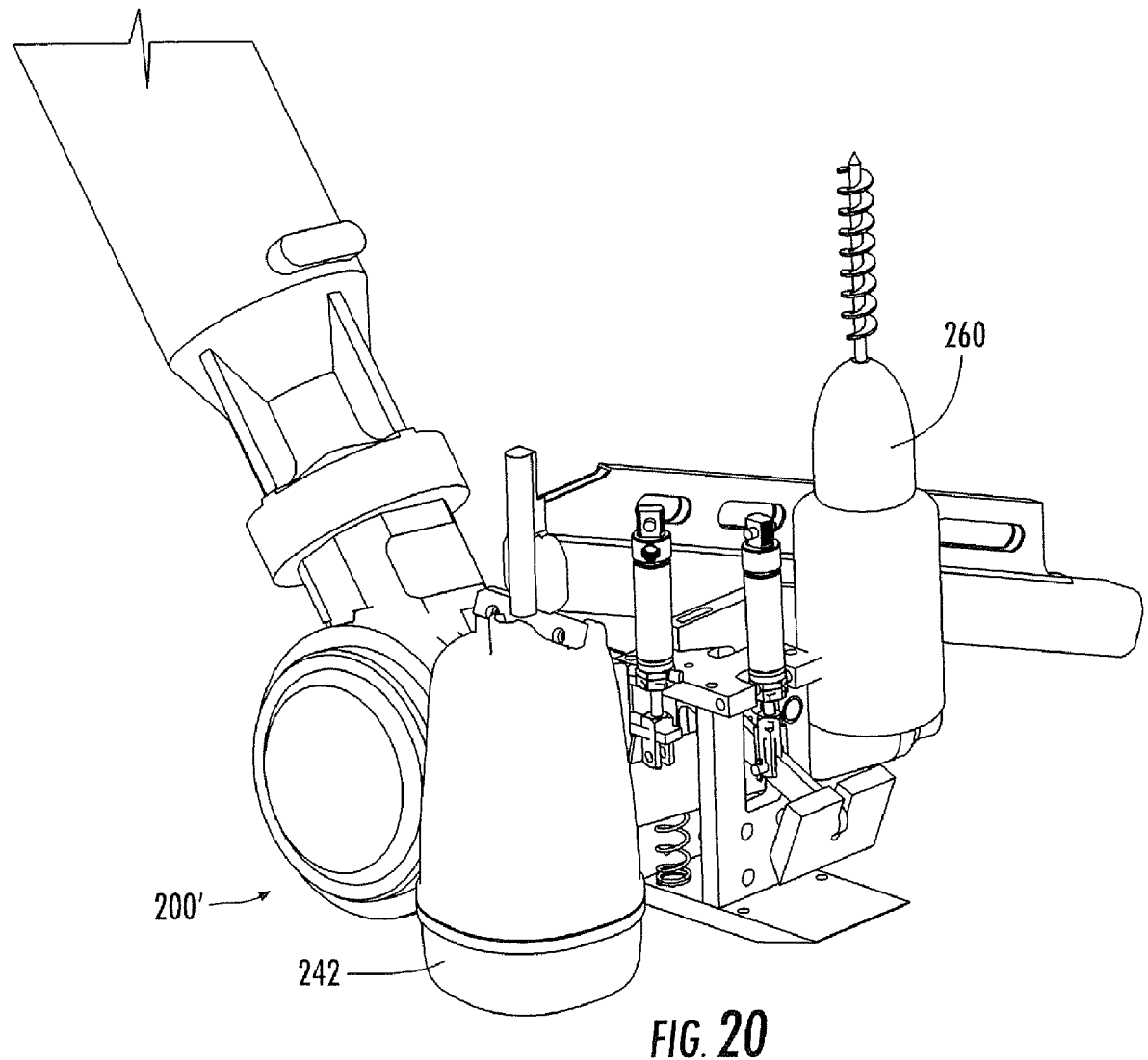
FIG. 20 is a perspective view of a gripper/nailer with an attached drill according to embodiments of the present invention.
Figure 21:
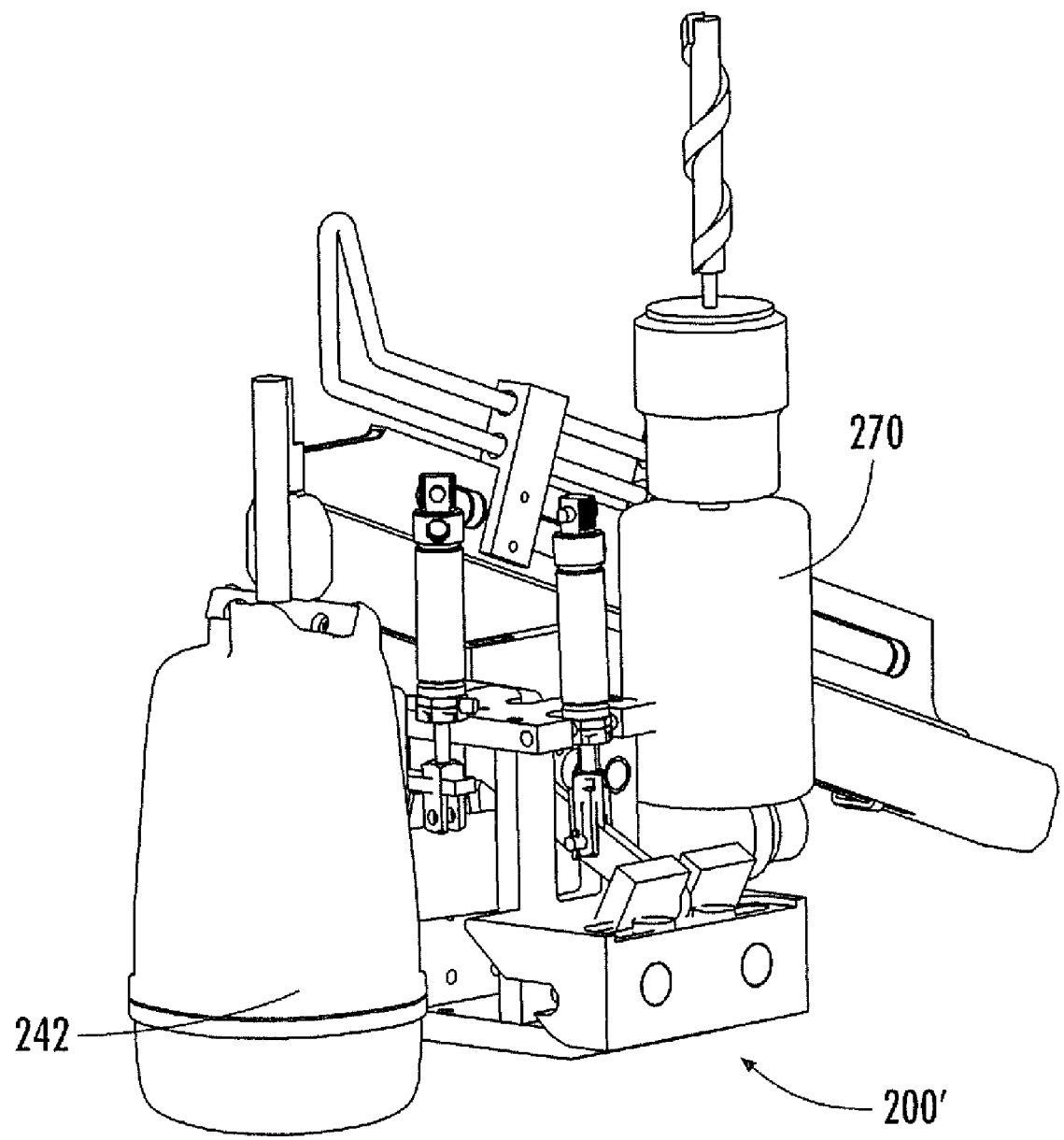
FIG. 21 is a perspective view of a gripper/nailer with an attached router according to embodiments of the present invention.

In addition, those skilled in this art will recognize that other tools with additional functions may be included in the gripper/nailer 200. For example, many wall panels include holes for the passage of electrical, telephone, television, or computer wires or cables, or for water pipes, or HVAC conduits. Referring to FIGS. 20 and 21, the inclusion of a drill 260 on the gripper/nailer 200' or a router 270 on a gripper/nailer 200" would enable such holes to be formed automatically by the gripper/nailer 200 during the fabrication of the wall panel. Other tools (e.g., a sander, a staple gun, etc.) may also be attached to the gripper/nailer in some embodiments for the performance of other functions/tasks.

In addition, the mounting configuration may be modified to allow limited relative motion between the nailer and the gripper and/or the wrist. This motion may be supplemented with dampers and springs to absorb shock forces of the nailing action and thus improve the nailing function.

Work Table

Referring now to FIG. 6, the work table 300 includes a generally rectangular and skeletal frame 302. The frame 302 is mounted directly on the rear uprights 60 of the frame 50 at a pivot 321. A pivot link 318 is attached at a pivot 320 to the frame 302 and extends therefrom to a pivot 322 with the forward uprights 58 of the frame 50. The pivots 320, 321, 322 and link 318 can enable the table 300 to rotate to a generally horizontal disposition for offloading. In some embodiments, features such as retractable wheels or rollers may be included to facilitate offloading. However, in some embodiments the frame 302 may be fixed to the frame 50.

The frame 302 supports a solid support surface 312 from underneath. The support surface 312 is typically formed of steel or another rigid material and is typically oriented as an angle of between about 0 and 80 degrees to the underlying surface. Such an angle can enable boards positioned on the support surface 312 to remain in position without shifting.

The support surface 312 may be of any size; in some embodiments, the support surface 312 is between about 9.5 feet in height and 6 and 13 feet in width in order to enable the production of a 9 ft.×12 ft. wall panel. One skilled in the art will recognize that larger wall panels may be made with the present invention by increasing the width and height of the work table (or by including mechanisms that allow the support surface 312 to move laterally and/or vertically) and including a translating base axis with the articulating arm unit 100. A plurality of vertical stops 314 is fixed to the frame 302 along one side thereof to define a vertical registration axis A7. Also, a plurality of horizontal stops 316 is fixed to the lower edge of the frame 302 to define a horizontal registration axis A8. The stops 314, 316 are typically used to define lower and right edges of a wall panel during fabrication.

Figure 17:
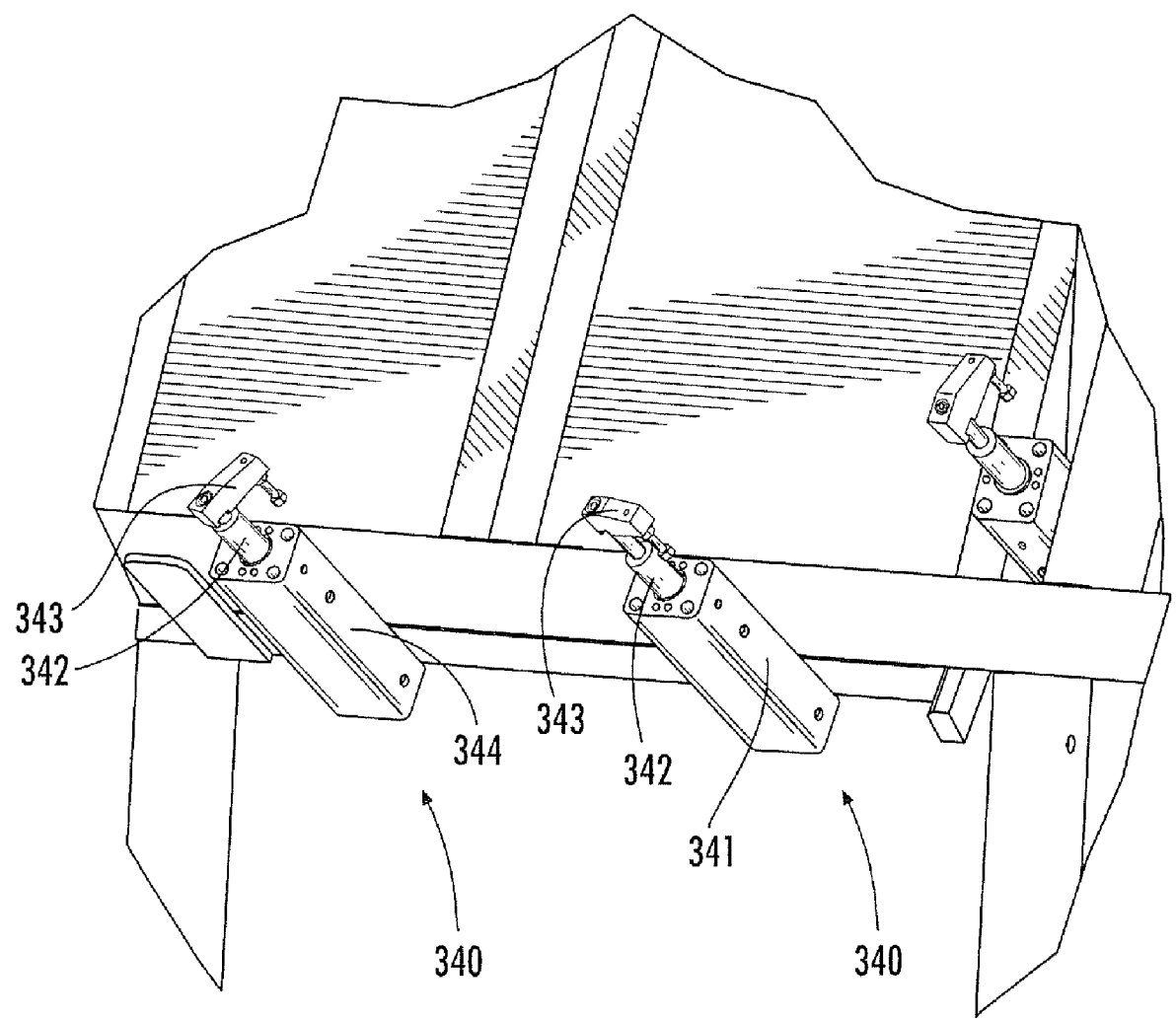
FIG. 17 is an enlarged perspective view of two pivoting clamps mounted to the lower edge of a table of the system of FIG. 1, with one of the clamps shown in a withdrawn position and the other shown in a clamping position.

In some embodiments, some additional components may be included. Referring now to FIG. 17, the table 300 may include one or more pneumatic pivoting clamps 340, each of which has a body 341, a sleeve 342, and a clamping arm 343. The clamp 340 can be used to secure a horizontal or vertical board to the table 300, but can also be pivoted out of the way about the axis formed by the sleeve 342 to avoid intereference with the gripper/nailer 200 and to facilitate placement of the board. An exemplary pivoting clamp is Model No. SC25x20R, available from Fabco-Air, Inc. (Gainesville, Fla.)

Figures 19, 19A:
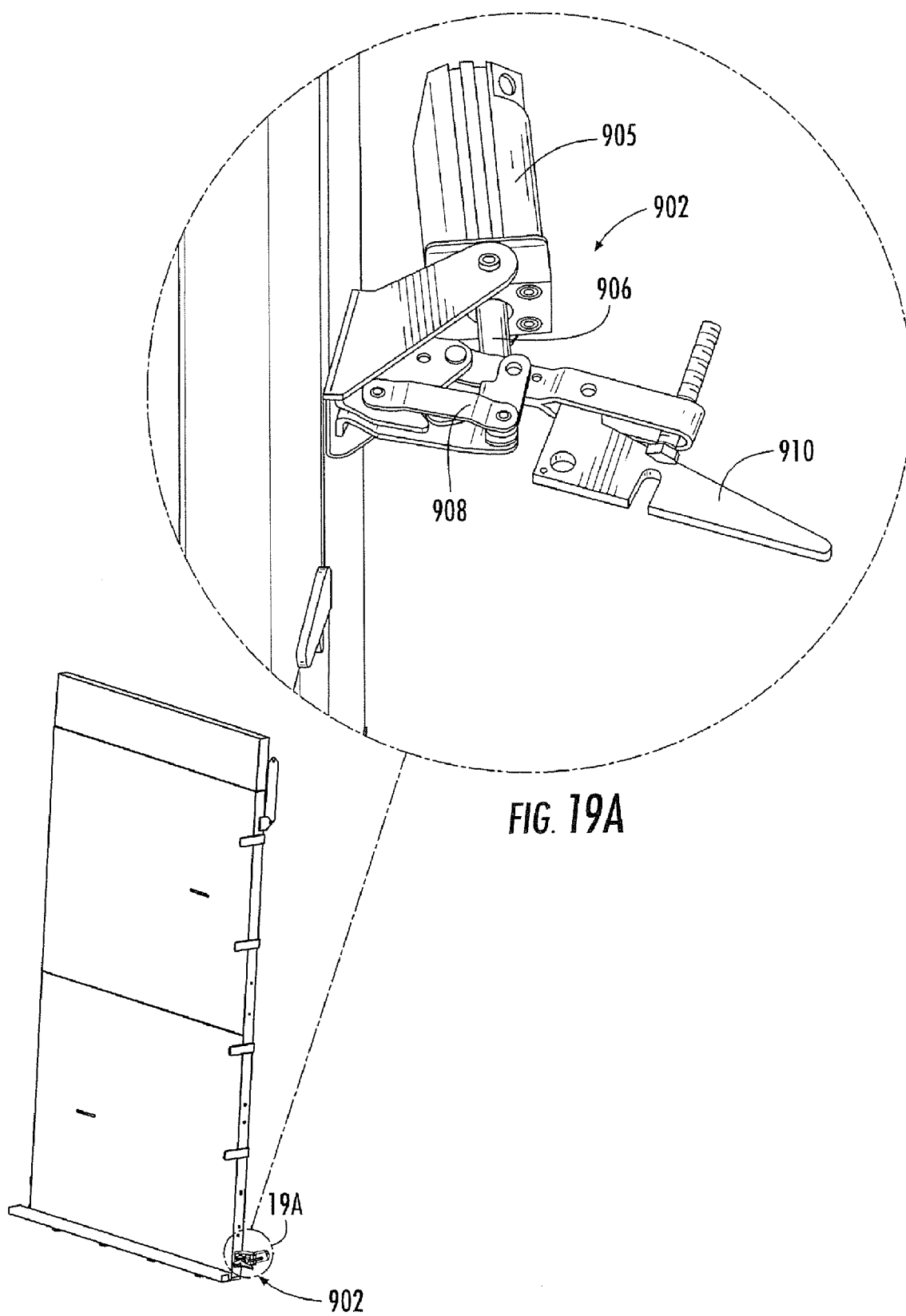
FIG. 19 is a perspective view of a table of the system of FIG. 1 with retractable stops according to embodiments of the present invention.
FIG. 19A is an enlarged perspective view of the retractable stops of FIG. 19, with one stop shown in a retracted position.
Figure 19B:
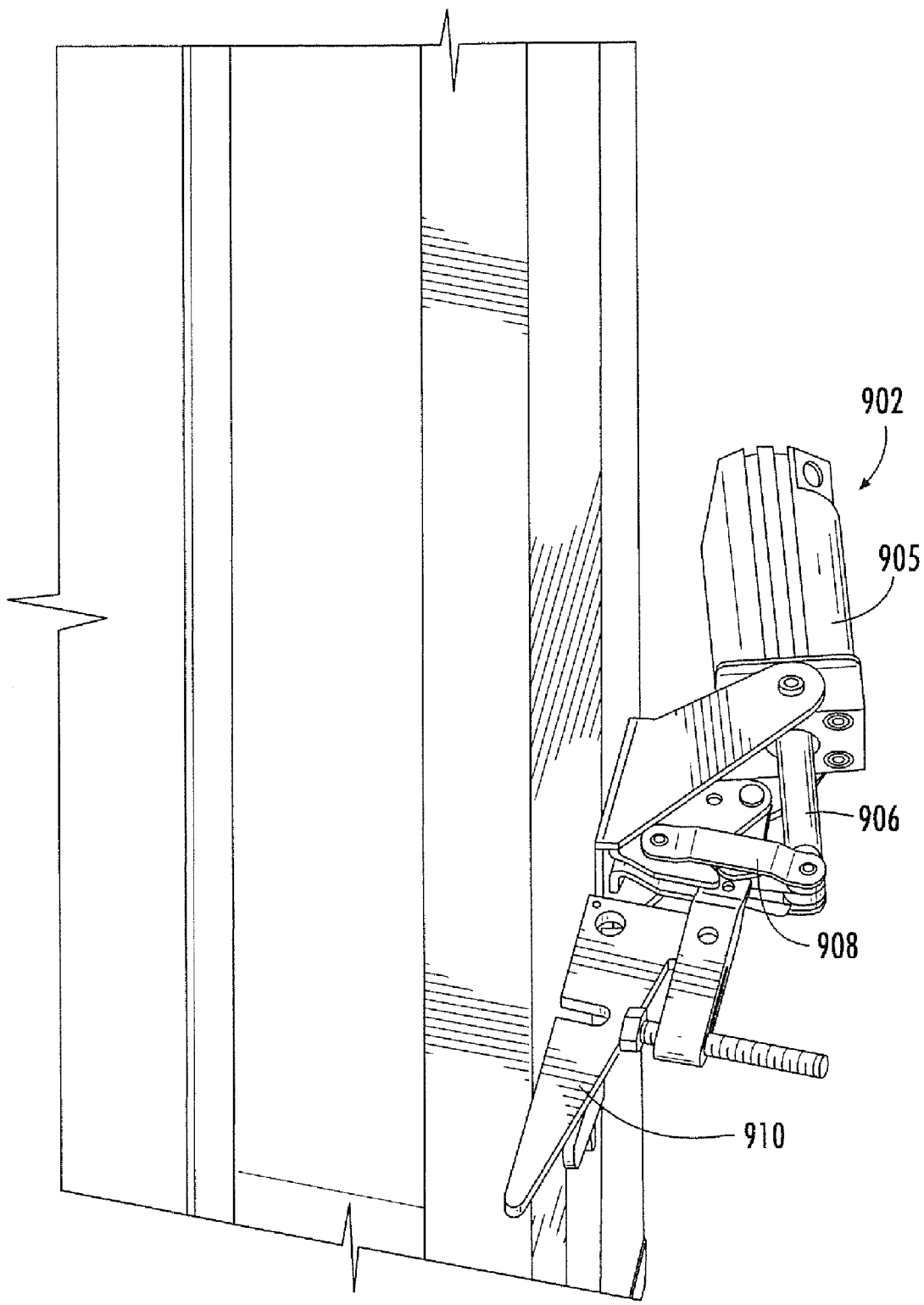
FIG. 19B is an enlarged perspective view of the retractable stops of FIG. 19 with one stop shown in an extended position.
Figure 19C:
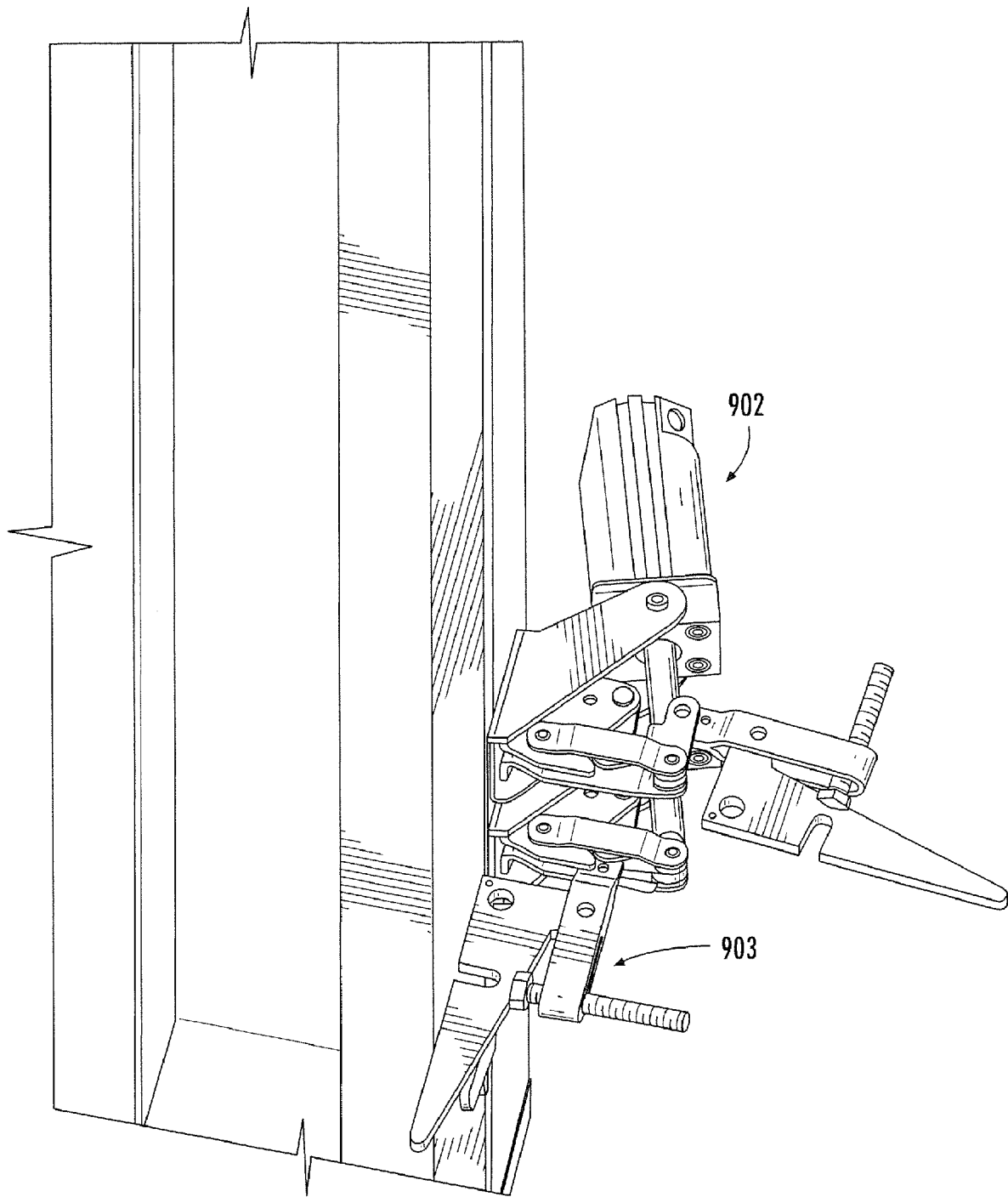
FIG. 19C is an enlarged perspective view of two retactable stops of FIG. 19, with one stop shown in a retracted position and the other shown in an extended position.

In other embodiments, the table 300 may include adjustable lateral stops 902, 903 (see FIGS. 19-19C). Each of the stops 902, 903 includes a pneumatic cylinder 905, a rod 906 with a linkage 908 attached thereto, a stop finger 910 that is pivotally attached to the linkage 908. The stop 902 is positioned laterally of the stop 903, and, in the illustrated embodiment, each is positioned laterally of an immovable stop 314. An exemplary stop finger is Model 807-U, available from De-Sta-Co, Inc. (Auburn Hills, Mich.).

As can be seen in FIG. 19B, the stop fingers 910 of either of the lateral stops 902, 903 can be extended by extending the rod 906 from the cylinder 905, which action pivots the stop fingers 910 into a position adjacent the edge of the table 300. When extended, the stop fingers 910 can define a slightly different lateral edge for a lateral plank. Redefining the edge of a wall may be desirable depending on how the studs of a wall are measured from the outermost stud. For example, if a wall's studs are arranged on 16 inch centers, in some instances the second stud from the edge is a full 16 inches from the outermost stud, whereas in other instances the second stud is 15¼ inches from the outermost stud. The presence of the lateral stops 902, 903 can assist in easily adjusting the table 300 to handle either of these conditions. The lateral stops 902, 903 may be used in the absence of a lateral stop 314 in some embodiments. Also, the lateral stops 902, 903 may be configured so that only one of the stops 902, 903 can be extended at any one time (see FIG. 19C).

Rack

Figure 10:
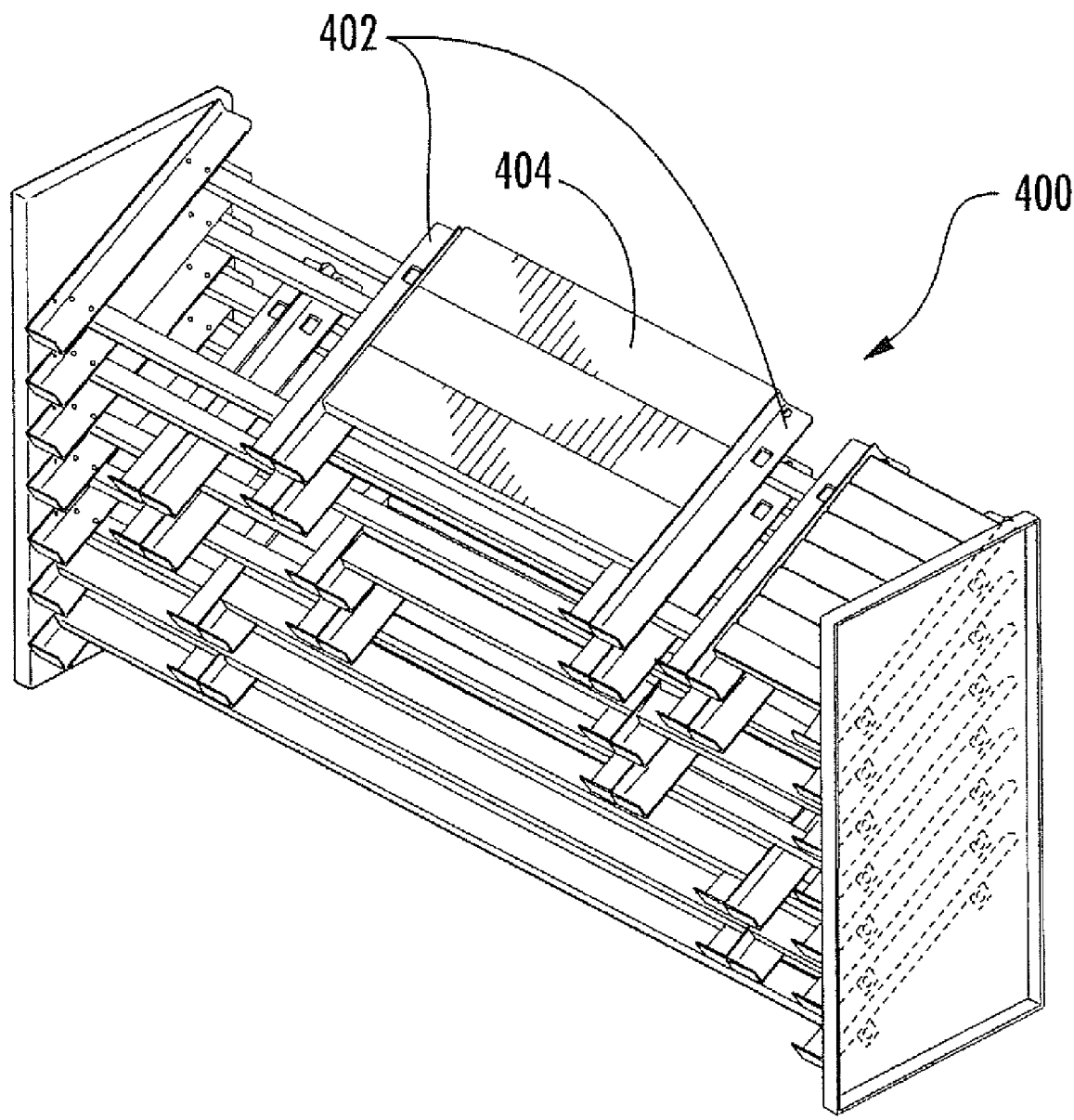
FIG. 10 is a perspective view of the rack of the system of FIG. 1.

Referring now to FIG. 10, the rack 400 is positioned adjacent the articulating arm unit 100 and the support table 300. The rack 400 includes multiple shelves, trays, compartments or the like in which wooden boards of like size can be stored. The rack 400 is configured so that the gripper/nailer 200 can access any of the compartments in order to grasp boards contained therein. The rack 400 may take any number of configurations that enable the presentation of boards of a known size and in a known location to the gripper for placement on the support table 300; in the illustrated embodiment, the boards are oriented generally horizontally, but in other embodiments vertical or other orientations may also be used. In some embodiments, the compartments may be adjustable in size to accommodate boards of different sizes/lengths. Also, in some embodiments, the rack 400 may be mounted to the frame 50 in order to maintain a predictable position relative to the articulating arm unit 100 and the work table 300.

Figure 14:
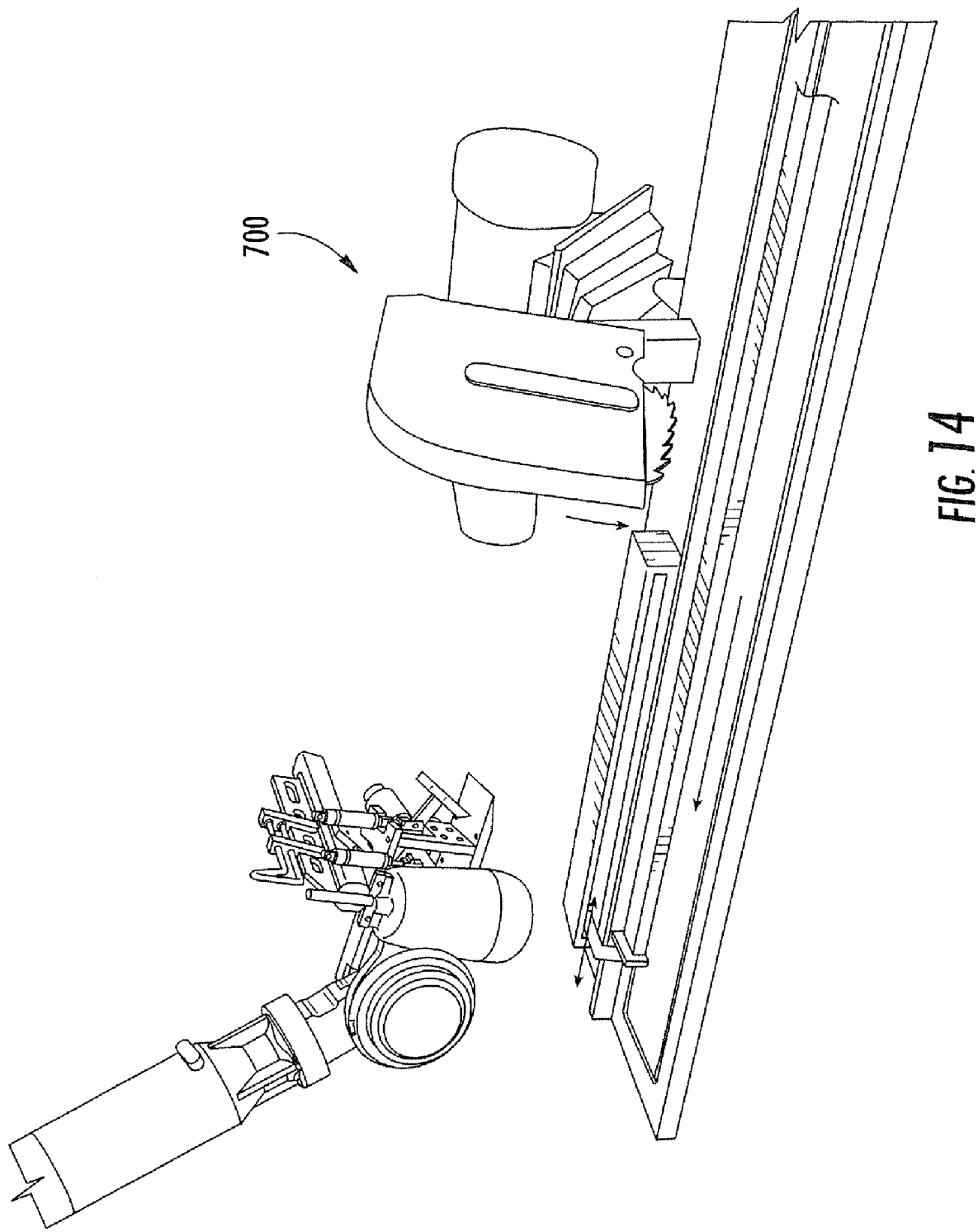
FIG. 14 is a perspective view of a cut-to-length saw that can be used in conjunction with a system of the present invention.

In some embodiments, the rack 400 may be associated with, or even replaced by, an automated "cut-to-length" saw that prepares boards or boards on demand (see FIG. 14, which illustrates saw 700). Such a saw may be connected to the controller 500, which directs the saw to cut a board to a specific length and present the freshly-cut board to the articulating arm unit 100 for retrieval and positioning on the work table 300. The use of a cut-to-length saw may reduce manpower requirements and eliminate the need for the rack 400.

Figure 16:
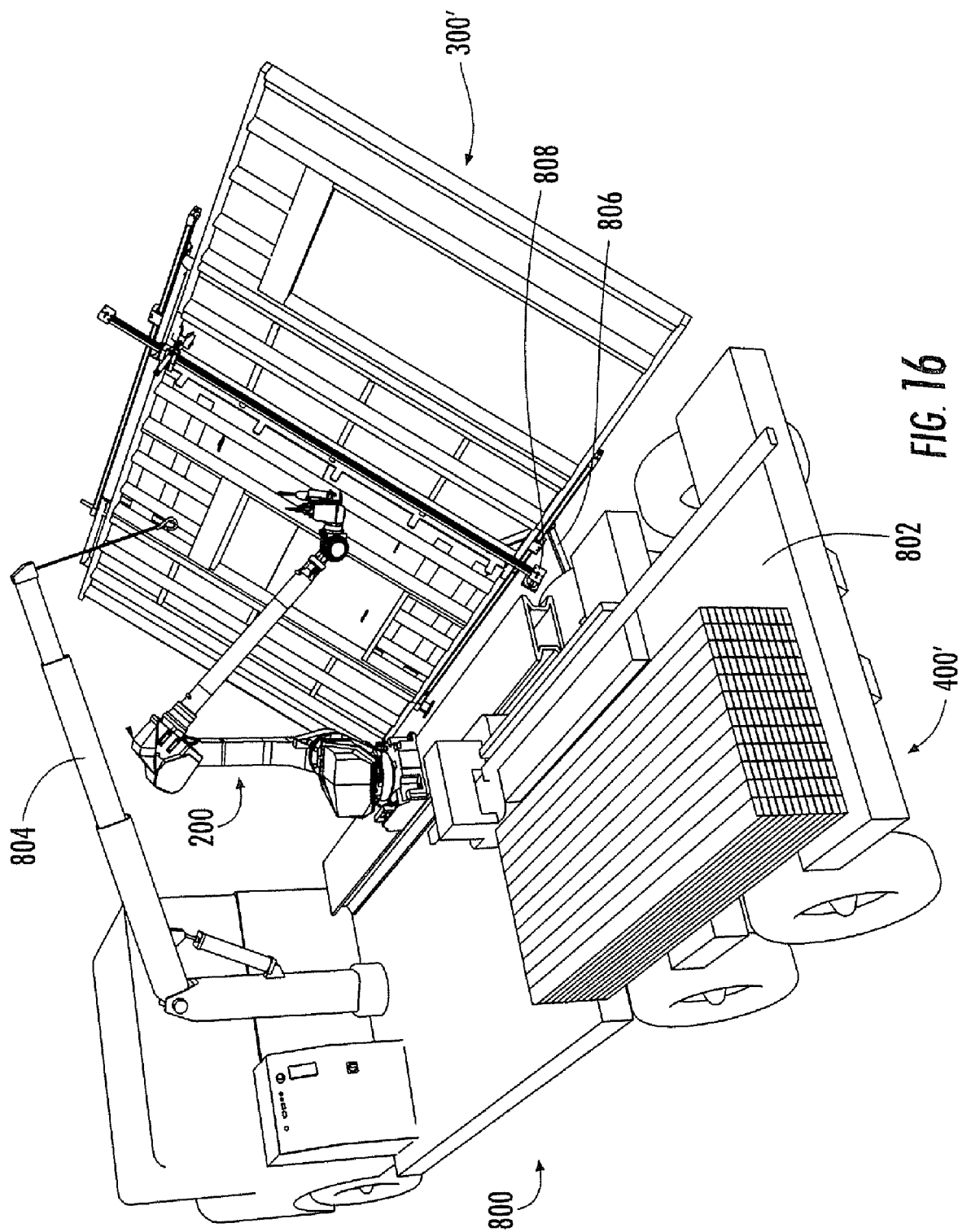
FIG. 16 is a perspective view of a truck on which is mounted a system according to embodiments of the present invention.

In further embodiments, the rack and the table may be mounted on a mobile vehicle, such as a truck, that can travel to a work site and construct walls on-site. As seen in FIG. 16, a truck 800 may have a bed 802 on which resides a rack 400' for boards. An arm 200' is also mounted on the bed 802. A table 300' is pivotally attached to the edge of the bed 802 at a pivot 806; the table 300' can pivot away from the bed 802 in operation and can pivot toward the bed 802 while in transit or storage. The table 802 can be moved via a crane 804 that is also mounted to the bed 802.

Basic Operation of the Articulating Arm Unit, Support Table and Rack

Figure 11:
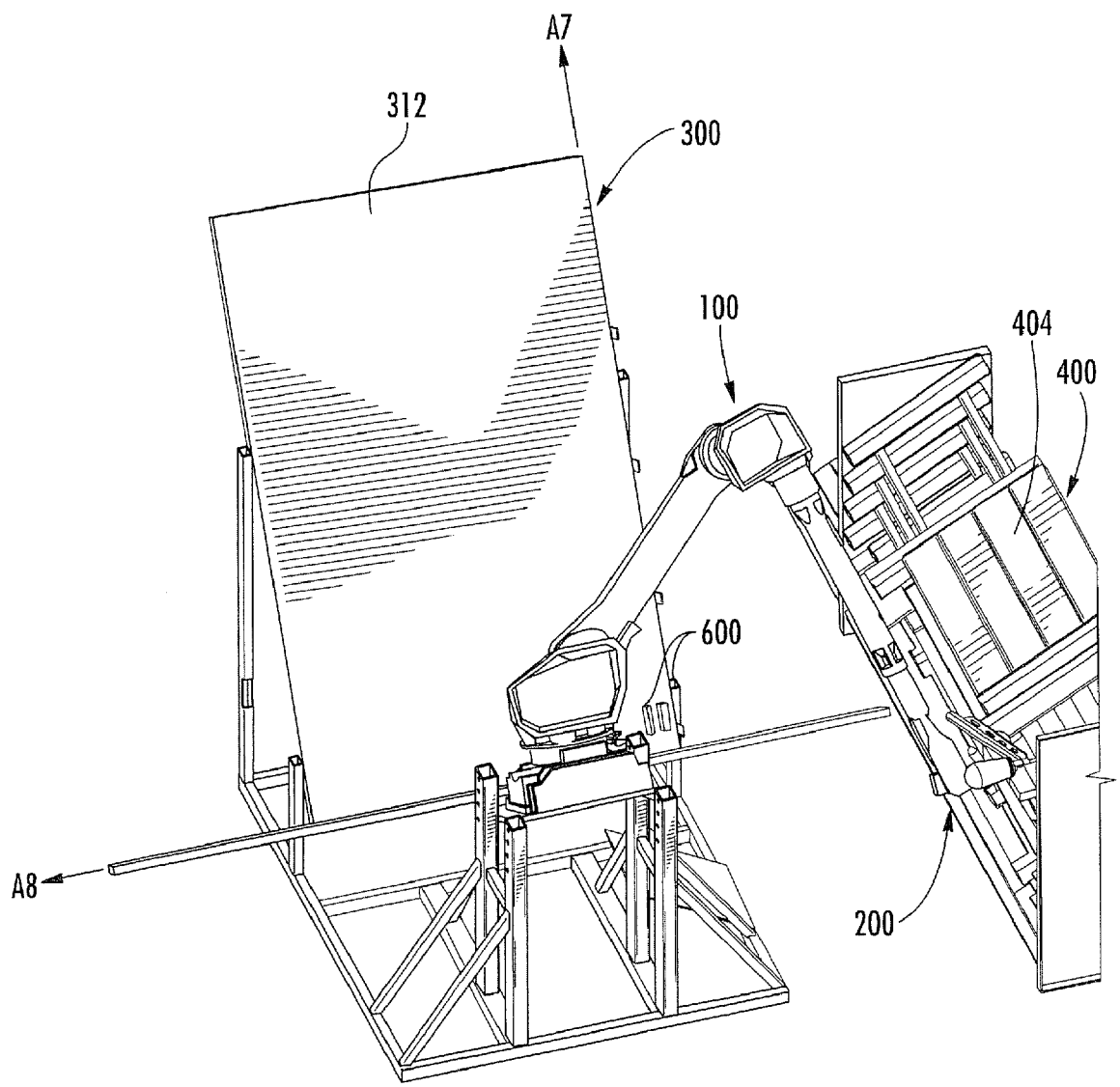
FIGS. 11-13 are sequential views demonstrating the operation of the system of FIG. 1.
Figure 12:
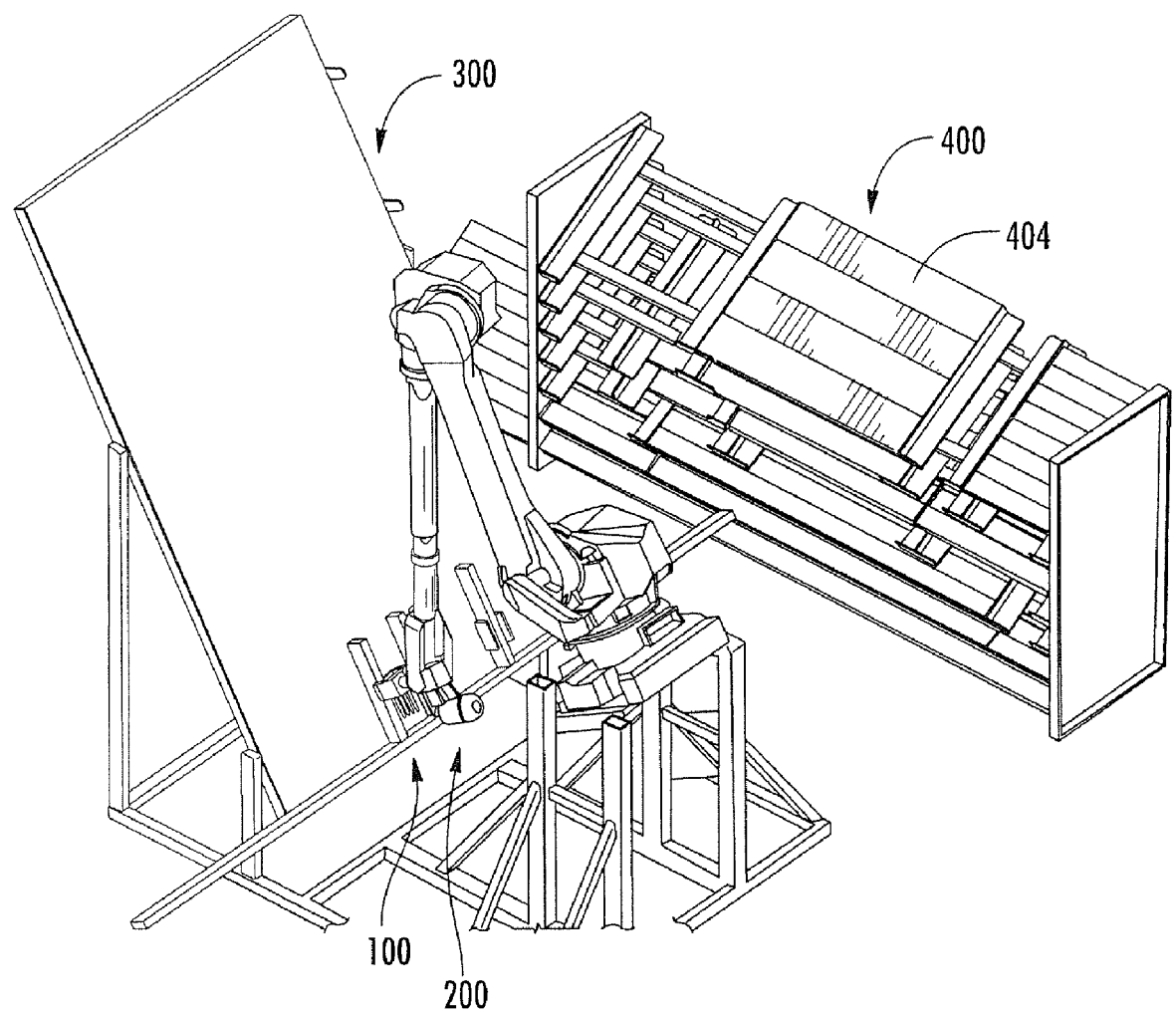
Figure 13:
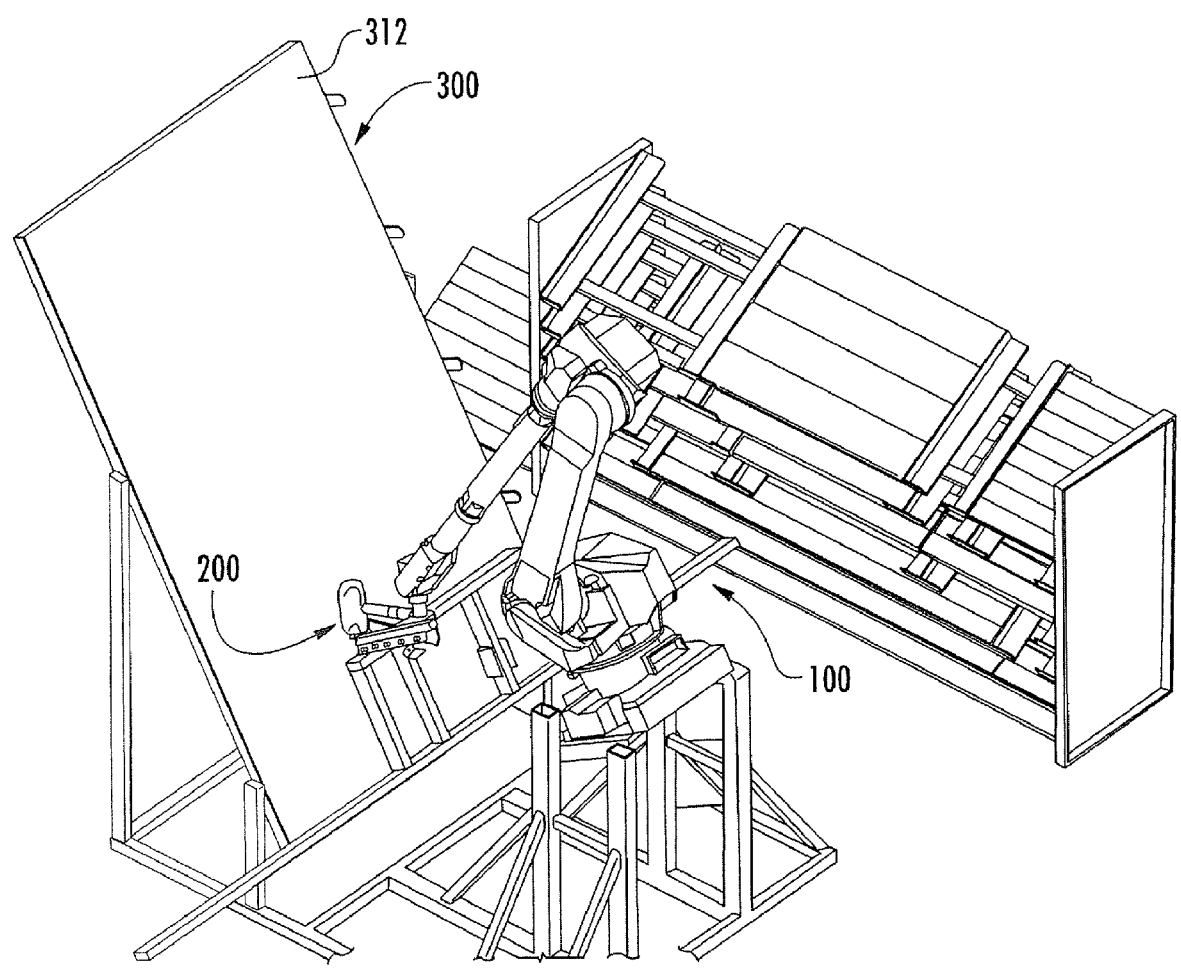

Referring now to FIGS. 11-13, to fabricate a specific wall panel, the rack 400 is loaded with wooden boards or boards of the appropriate size; boards of similar size are stored on the same shelf within the rack 400. Based on directions from the controller 500 (described in greater detail below), the articulating arm unit 100 moves the gripper/nailer 200 to the rack 400 and grasps a board of the correct size. The grasping motion of the gripper/nailer 200 is initiated via actuation of the pneumatic cylinder 218, which extends its retractable rod 218; such extension causes the pivot arm 216 to pivot about the pivot 222 and move the finger 214 toward the stationary grip finger 210 (see FIGS. 7-9 for details of the gripping unit 201). Once the gripper/nailer 200 has grasped the board (FIG. 11), the articulating arm unit 100 moves the board to the support surface 312 of the table 300, orients the board in its correct orientation, places the board on the support surface 312, and releases the board by retracting the rod 218a of the pneumatic cylinder 218 (FIG. 12). Notably, boards that define the lower surface of the wall panel to be fabricated are positioned to rest on the horizontal stops 316, and boards that define the rightmost edge of the wall panel are positioned against the vertical stops 214. The controller 500 continues to direct the articulating arm unit 100 to retrieve boards from the rack 400 and position them on the support surface.

Figure 11A:
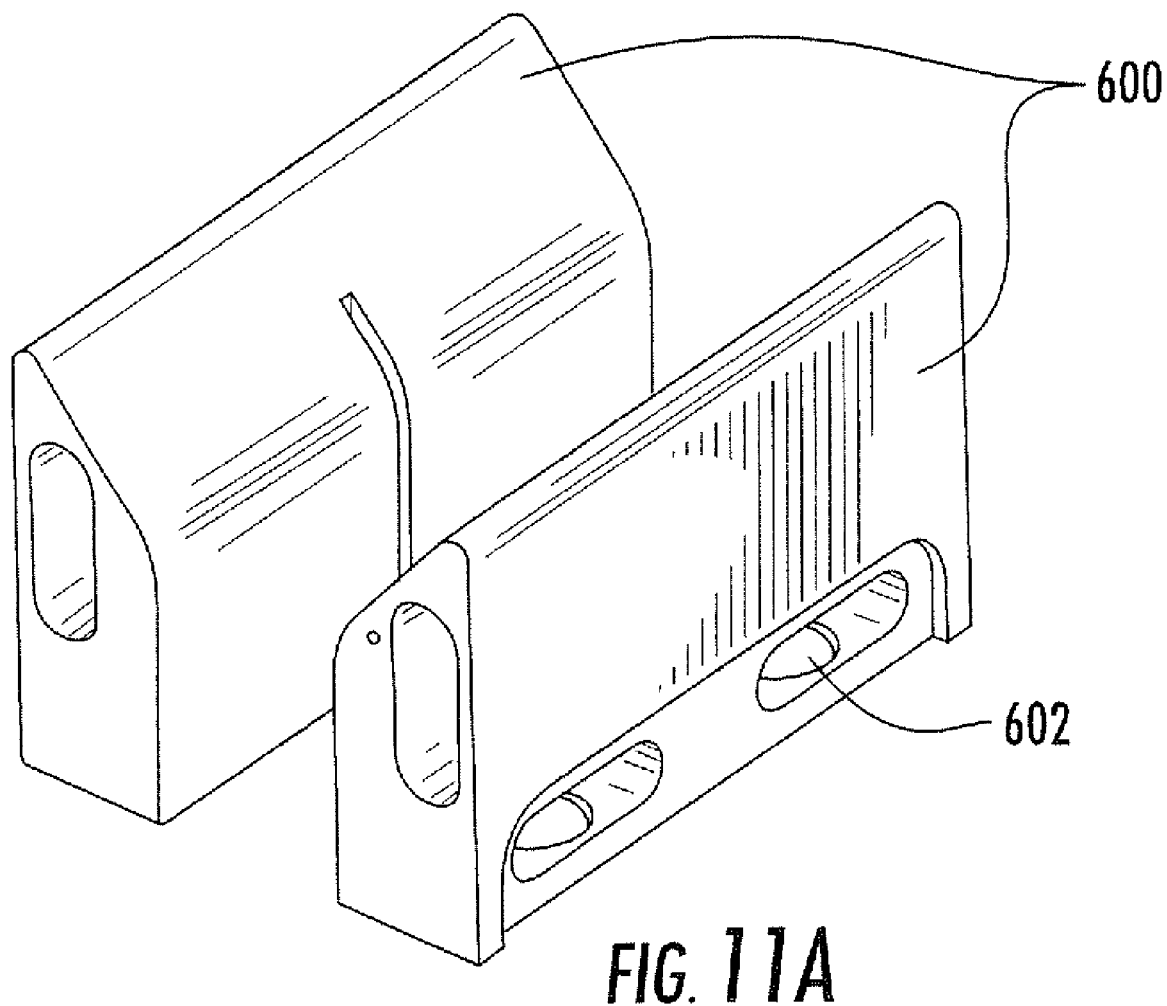
FIG. 11A is a perspective view of guides that can be used in connection with the work table of the system of FIG. 1.
Figure 18:
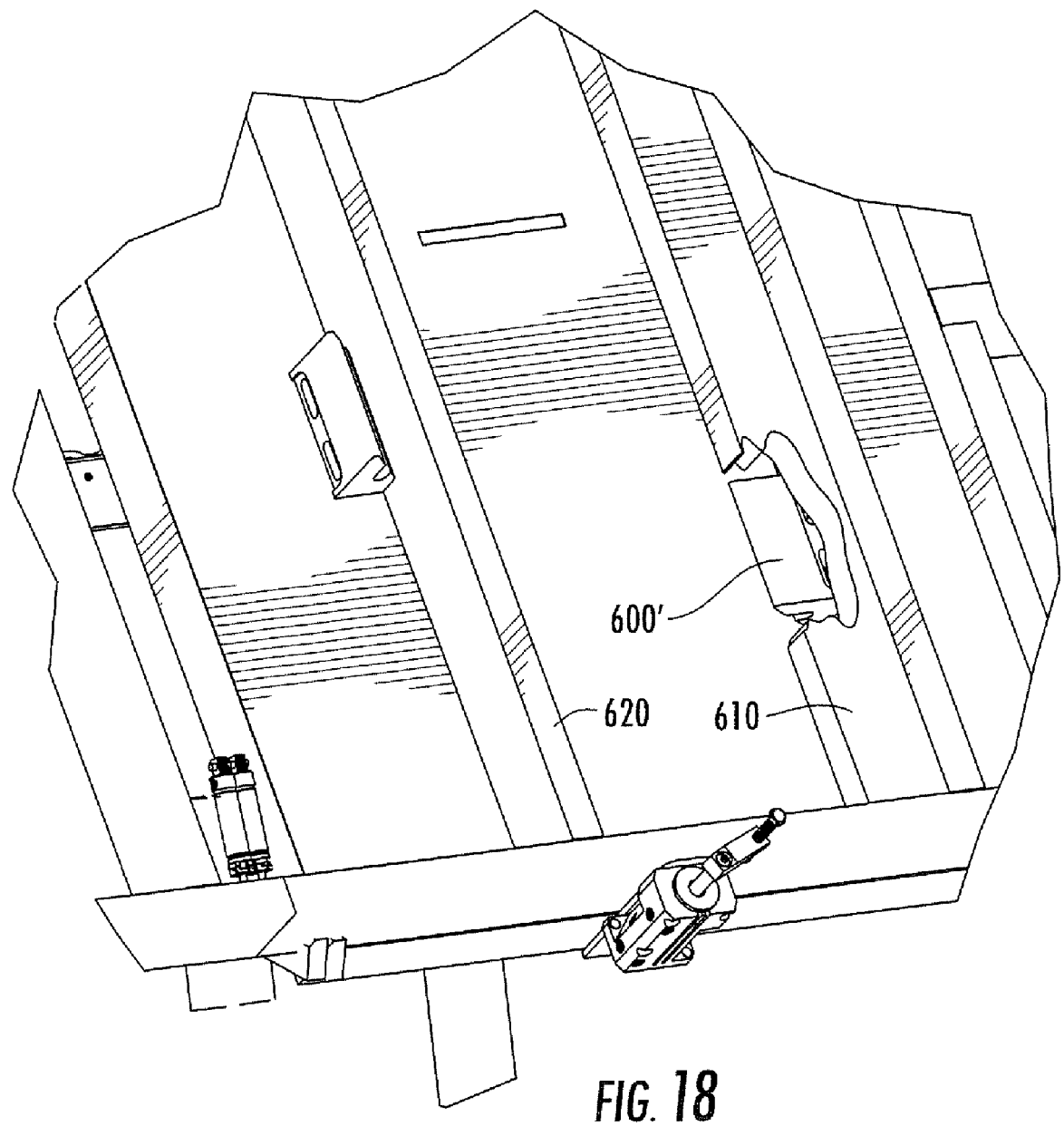
FIG. 18 is an enlarged perspective view of the guide of FIG. 11A oriented to support a board from underneath.

In some embodiments, it may facilitate placement of the boards, and in particular vertically-oriented boards, to employ removable and replaceable guides on the support surface 312. Such guides, shown at 600 in FIG. 11A, may have sloped receiving edges to urge a board into position and retain the board in that position during fabrication. The guides 600 may be magnetic to attach to the support surface 312 or may be attached in another fashion. The guides may also be permanently mounted to the support table at strategic locations and adjustable (under computer control) to engage and hold a board in place. It can also be seen in FIG. 18 that a guide 600' may be oriented with its longer surfaces parallel to the support surface 312 and provide support from underneath for boards 610 that are oriented with their longer cross-sectional dimension parallel with the support surface 312.

After a predetermined number of boards have been arranged on the support surface 312 (typically less than the entire wall panel), the controller 500 signals the gripper/nailer to conduct a nailing pass. The articulating arm unit 100 moves the gripper/nailer 200 to the correct position and orients the gripper/nailer 200 so that the barrel 246 of the nailing unit 242 contacts a predetermined joint location on a board (see FIG. 9 for details of the nailing unit 242). When in position, the stabilizing foot 238 presses against the board to secure it in place during the nailing operation. The controller 500 signals a pneumatic cylinder to actuate the trigger 248 of the nailing unit 242, which causes a nail, fed by the magazine 232 to the barrel 246, to be inserted into the boards at the joint location (see FIG. 13). The controller 500 then repeats this process for the remaining joint locations in that nailing pass.

The controller 500 continues to direct the articulating arm unit 100 to alternately position groups of boards, then perform nailing passes, until the wall panel is complete. In some embodiments, the support surface 312 of the table 300 can then be rotated to a horizontal position to facilitate offloading of the finished wall panel.

Controller and Software

Figure 15:
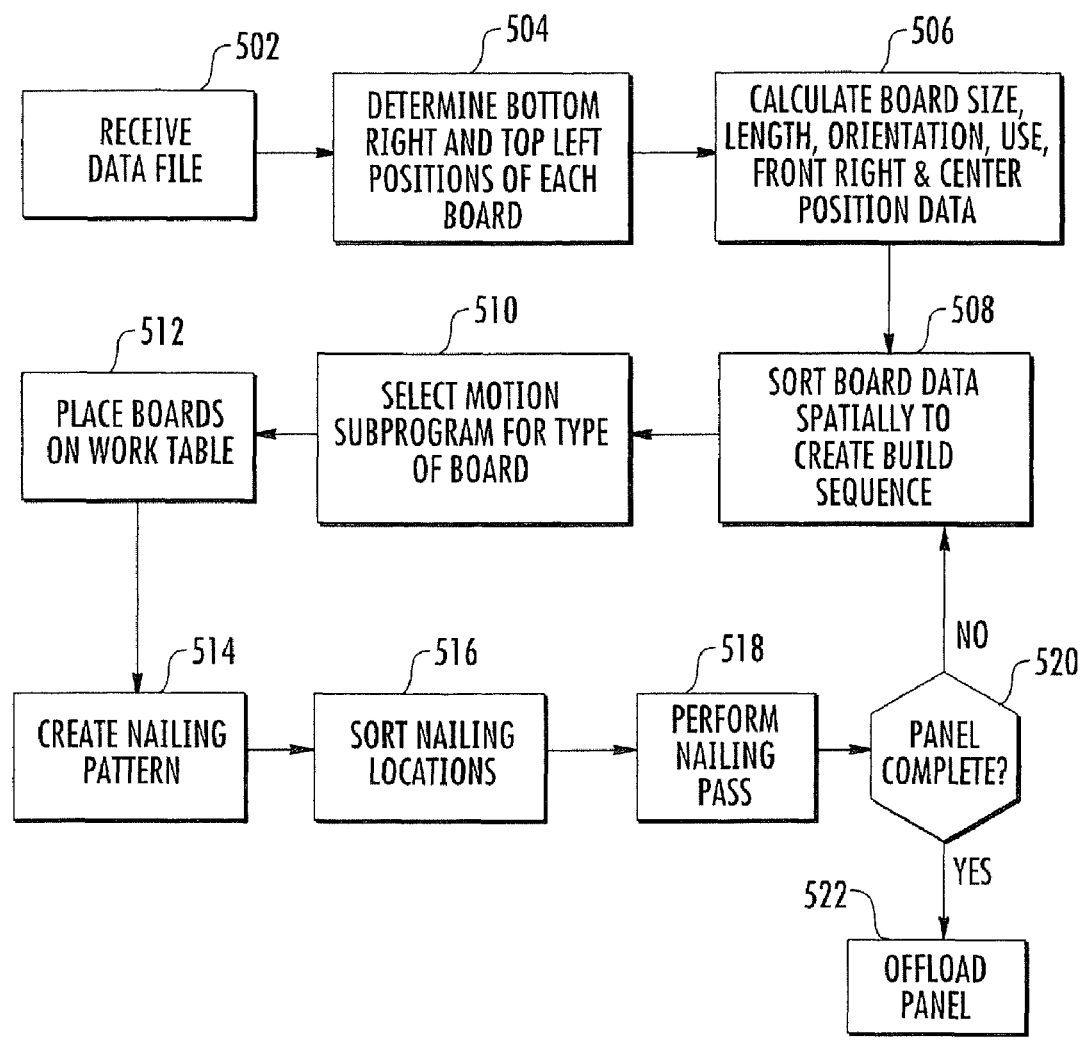
FIG. 15 is a flow chart illustrating operations according to embodiments of the present invention.

As noted above, the controller 500 is connected with and controls the articulating arm unit 100, and includes information about the locations of the support table 300 and the rack 400. In order to control the fabrication of a wall panel, first the controller 500 interprets a user-supplied data file describing the spatial location of each board in the wall panel (box 502 in FIG. 15). The location may be expressed as bottom right and top left coordinates of the board in the wall panel, or other specifications such as board dimensions and center location may be used. In some embodiments, the controller relies on software written in the KAREL language (available, for example, in the Fanuc M710iC/20L device discussed above) to receive and interpret a computer-aided drafting (CAD) file. Exemplary CAD files that are suitable for receipt and interpretation include files in AUTOCad, SolidBuilder (by Digital Canal of Dubuque, Iowa, and Panelview (by ITW Building Components Group, Pompano Beach, Fla.). The CAD information can be used to determine the size and the locations of the various boards. Board size, orientation, use, length, front right xyz position and center xyz position can calculated for each board and compiled into an array of data structures (boxes 504 and 506).

Once the data for all of the boards are loaded into the array, the board data are sorted spatially from (a) front to back (z-direction), right to left (y-direction) and bottom to top (x-direction) using a bubble sort or other sorting algorithm (box 508). This information is used to determine the sequence to be followed in retrieving and placing boards on the support surface 312. Other sorting sequences may also be employed.

After the board placement sequence is created, the main program determines which motion control sub-program to call in order to instruct the gripper/nailer 200 to physically pick and place the proper board (box 510). These motion control programs may be structured to have a common pickup and drop-off routine that is controlled by dimensional offsets; therefore, depending on what offset is used, a particular board will be picked and placed in the correct location. The motions surrounding the pick and drop, however, are tailored to each class of board (header, trimmer, cripple, stud, etc.) to ensure proper manipulation. A subset of boards is then picked and placed on the support surface 312 with the gripper/nailer 200 (box 512). Alternatively, a rules-based sequencing and motion planning algorithm may be used to command motions which pick and place boards without colliding or interfering with previously placed boards and other obstacles within the work area.

When a board is placed on the table a nail pattern determined by board orientation, use and building code is created. This pattern includes the spatial location and orientation of the nails (i.e., left, right, front, top, bottom, toe, etc.) (box 514). Each nail data structure is loaded into an array to be used by the main program when necessary.

After placement of key boards (for example, after a header or trimmer), the controller 500 instructs the gripper/nailer 200 to perform a nailing pass. The first action is to group the array of nail data structures by direction and then sort by spatial location, front to back (z), right to left (y) and bottom to top (x) (box 516); this can be done by using a bubble sort or another sorting algorithm. After sequencing, another set of teach pendant motion programs are called to instruct the gripper/nailer 200 to physically nail the boards (box 518). In some embodiments, each instruction has an associated motion program. Also, in some embodiments the controller 500 utilizes safety point motion programs that are summoned between direction changes to ensure there are no collisions between the end of arm tooling and the work area. As with the board placement programs, a rules-based sequencing and motion planning algorithm may be used to command motions for nailing the boards without colliding or interfering with previously placed boards and other obstacles within the work area.

The process of placing boards and performing nailing passes is repeated until all boards in the wall panel are placed and nailed (box 520). At this point the controller 500 may instruct the articulating arm unit 100 to retract, and in some embodiments may instruct the table 300 to pivot to a horizontal position to facilitate offloading of the completed wall panel (box 522).

Those skilled in this art will appreciate that the structure of the software may vary, such that the number or sequence of steps may vary. For example, in some embodiments all of the boards may be positioned prior to any nailing passes. In other embodiments, the timing and planning sequence of nailing operations may be calculated prior to the positioning of boards, rather than being done "on the fly." Different subroutines may be called to avoid interference with the boards already positioned on the support surface. The controller 500 may also keep track of nail and board inventory/availability and provide a notice for replenishment, and may also note the numbers of boards and nails used for accounting purposes.

In addition, one potential enhancement is the ability of the software and/or the gripper/nailer would be a sensor that can detect a knot, a hole, a deformation, or other non-uniformity in a board. With such a non-uniformity identified, the software could redirect the gripper/nailer to another location on the board for nailing, or could reorient and reposition the board on the support surface 312, or could retrieve a replacement board for nailing in the same location.

Those skilled in this art will also appreciate that the present invention may be employed for the construction of building component assemblies other than wall panels. Exemplary alternative components include roof and floor trusses, archways, rake-walls, and foundation walls. Application of sheathing may also be accomplished with appropriate modification of end-of-arm tooling.

It will also be recognized by those skilled in this art that in some embodiments, either the nailer or the gripper may be omitted, and in other embodiments both may be present but attached to separate and distinct robotic arms.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A device for constructing an assembly of building components, comprising:
    an articulating arm unit; and
    a gripper and nailer mounted on an end of the articulating arm unit, wherein the gripper and nailer includes a gripping unit for grasping building components and positioning them in a predetermined arrangement, and a nailing unit for inserting a fastener to secure the building components together.

2. The device defined in claim 1, wherein the nailing unit is configured to insert nails into the building components.

3. The device defined in claim 1, wherein the articulating arm unit is a 6-axis articulating arm unit having a wrist member, and wherein the gripper and nailer is mounted on the wrist member.

4. The device defined in claim 1, further comprising a controller that is operably associated with the articulating arm and the gripper and nailer, the controller being configured to provide instructions on component placement and nailing location to the articulating arm unit and the gripper and nailer.

5. The device defined in claim 1, wherein the nailer operates on a first axis, and the gripper operates on a second axis that is different from the first axis.

6. A system for constructing an assembly of building components, comprising:
    a frame;
    an articulating arm unit mounted on the frame;
    a gripper and nailer mounted on an end of the articulating arm unit, wherein the gripper and nailer includes a gripping unit for grasping building components and positioning them in a predetermined arrangement, and a nailing unit for inserting a fastener to secure the building components together; and
    a support surface mounted on the frame, the support surface positioned and configured to receive building components from the gripping unit and maintain the building components in position for securing by the nailing unit.

7. The system defined in claim 6, wherein the articulating arm has a stationary base mounted to the frame and a rotating member rotatably attached to the stationary base for rotation about a first axis, the first axis being oriented at an oblique angle to a horizontal surface underlying the frame.

8. The system defined in claim 7, wherein the support surface defines a support plane, and wherein a second axis normal to the support plane is oriented at an oblique angle to the horizontal surface underlying the frame.

9. The system defined in claim 8, wherein the second axis forms an angle of between about 10 and 90 degrees with the first axis.

10. The system defined in claim 8, wherein the first axis is oriented at an angle of between about 10 and 45 degrees to the horizontal surface, and wherein the second axis is oriented at an angle of between about 10 and 90 degrees to the horizontal surface.

11. The system defined in claim 7, wherein the support surface is pivotally mounted to the frame and movable between an upright position, in which the support surface is angled relative to a horizontal surface underlying the frame and faces generally the articulating arm, and an offloading position, in which the support surface is generally horizontally disposed.

12. The system defined in claim 7, further comprising horizontal stops that are fixed adjacent lower edge of the support surface, and vertical stops that are fixed adjacent a side edge of the support surface.

13. The system defined in claim 12, wherein one of the horizontal stops and the vertical stops are configured to be retractable from the support surface.

14. The system defined in claim 7, further comprising a controller that is operably associated with the articulating arm and the gripper and nailer, the controller being configured to provide instructions on component placement and nailing location to the articulating arm unit and the gripper and nailer.

15. The system defined in claim 6, further comprising a rack that supplies building components to the gripper.

16. The system defined in claim 6, further comprising a cut-to-length saw that forms building components to a desired length and provides them to the gripper.

17. The system defined in claim 6, further comprising guides mounted to the support surface.

18. The system defined in claim 17, wherein the guides include magnets for attached to the support surface.

19. A device for constructing an assembly of building components, comprising:
an articulating arm unit;
a gripper mounted on an end of the articulating arm unit that includes a gripping unit for grasping building components and positioning them in a predetermined arrangement; and
a controller that is operably associated with the articulating arm and the gripper, the controller being configured to receive data from a computer-aided drafting (CAD) file, convert that data into component positions, and provide instructions to the gripper on component placement;
further comprising a nailing unit mounted on the end of the articulating arm unit, the nailing unit configured to insert fasteners to secure the building components together; and
wherein the controller is configured to provide instructions to the nailing unit regarding nailing locations.

20. The device defined in claim 19, further comprising a support surface that is positioned to receive arranged building components.

21. The device defined in claim 19, further comprising a rack configured and positioned to supply building components to the articulating arm unit.

22. The device defined in claim 19, further comprising a cut-to-length saw configured to form building components to a desired length, wherein the controller is configured to control the operation of the cut-to-length saw.

23. A computer program product for controlling operation of a system for constructing assemblies of building components, comprising:
a computer readable storage medium having computer readable program code embodied therein, the computer readable program code comprising:
computer readable program code configured to receive data regarding an assembly of building components;
computer readable program code configured to direct a gripper on an articulating arm unit to retrieve individual building components from a supply of building components;
computer readable program code configured to direct the gripper on the articulating arm unit to position the building components in predetermined positions to form a predetermined arrangement of building components; and
computer readable program code configured to direct a nailing unit mounted on the articulating arm unit to secure the building components together to form an assembly of building components.

24. The computer program product defined in claim 23, wherein the data received is data generated by a computer-aided drafting (CAD) program.

25. The computer program product defined in claim 23, further comprising computer readable code configured to convert the CAD data into building component data by identifying a lower right position and a center position of each building component.

26. The computer program product defined in claim 23, wherein the computer readable program code is further configured to determine nailing locations for directing the nailing unit responsive to the locations of the arranged building components.

27. The computer program product defined in claim 23, further comprising computer readable code configured to control the cutting of lengths of building components with a cut-to-length saw.

28. A device for constructing an assembly of building components, comprising:
an articulating arm unit;
a gripping unit mounted on an end of the articulating arm unit for grasping building components and positioning them in a predetermined arrangement; and
an automated nailing unit for inserting a fastener to secure the building components together.

29. A device for constructing an assembly of building components, comprising:
an articulating arm unit; and
a gripper and nailer mounted on an end of the articulating arm unit, wherein the gripper and nailer includes a gripping unit for grasping building components and positioning them in a predetermined arrangement, and a nailing unit for inserting a fastener to secure the building components together;
wherein the gripper and nailer includes a drill and/or router for forming holes in the building components.

* * * * *

UNITED STATES PATENT AND TRADEMARK OFFICE
CERTIFICATE OF CORRECTION

PATENT NO. : 8,185,240 B2  
APPLICATION NO. : 12/547806  
DATED : May 22, 2012  
INVENTOR(S) : Williams et al.

Page 1 of 1

It is certified that error appears in the above-identified patent and that said Letters Patent is hereby corrected as shown below:

Column 7, Line 24: Please correct "200"" to read -- 200' --

Signed and Sealed this  
Twenty-third Day of October, 2012

David J. Kappos  
*Director of the United States Patent and Trademark Office*